(12) United States Patent
Hagiwara

(10) Patent No.: US 9,948,862 B2
(45) Date of Patent: Apr. 17, 2018

(54) DATA DISPLAY APPARATUS WHICH CONTROLS DISPLAY OF A PLURALITY OF DATA, IMAGE DISPLAY APPARATUS WHICH INDIVIDUALLY DISPLAYS A SERIES OF IMAGES, DATA DISPLAY METHOD, IMAGE DISPLAY METHOD, AND STORAGE MEDIUM

(71) Applicant: CASIO COMPUTER CO., LTD., Shibuya-ku, Tokyo (JP)

(72) Inventor: Kazuaki Hagiwara, Koshigaya (JP)

(73) Assignee: CASIO COMPUTER CO., LTD., Tokyo (JP)

(*) Notice: Subject to any disclaimer, the term of this patent is extended or adjusted under 35 U.S.C. 154(b) by 201 days.

(21) Appl. No.: 14/537,668

(22) Filed: Nov. 10, 2014

(65) Prior Publication Data

US 2015/0130981 A1    May 14, 2015

(30) Foreign Application Priority Data

Nov. 12, 2013  (JP) ................................ 2013-233595
Nov. 12, 2013  (JP) ................................ 2013-233677

(51) Int. Cl.
*H04N 5/232*  (2006.01)
*H04N 5/235*  (2006.01)

(52) U.S. Cl.
CPC ....... *H04N 5/23293* (2013.01); *H04N 5/2356* (2013.01); *H04N 5/23216* (2013.01); *H04N 5/23245* (2013.01)

(58) Field of Classification Search
CPC ........... H04N 5/23293; H04N 5/23245; H04N 5/2356; H04N 5/23216
See application file for complete search history.

(56) References Cited

U.S. PATENT DOCUMENTS 7,508,438 B2   3/2009   Okamoto et al.
7,511,745 B2   3/2009   Aoyama
(Continued)

FOREIGN PATENT DOCUMENTS

JP   2001285779 A   10/2001
JP   2002232751 A   8/2002
(Continued)

OTHER PUBLICATIONS

JP 2003101910 translation.*
(Continued)

*Primary Examiner* — Twyler Haskins
*Assistant Examiner* — Angel L Garces-Rivera
(74) *Attorney, Agent, or Firm* — Holtz, Holtz & Volek PC

(57) ABSTRACT

In the present invention, a control section distinctly displays, as indexes for indicating that data (image) switching can be performed from a starting point that is the arrayed position of data selected as a display target from among a plurality of data arrayed in virtual and multiple dimensions based on plural types of imaging parameters, information regarding the array status of the plurality of data on a display section, in association with plural directions in which data switching can be performed. As a result of this configuration, when instructing to perform data switching in a direction arbitrarily selected from among a plurality of data switching directions, the user can instruct to perform data switching while visually checking information regarding the array status of data for each data switching direction. That is, by this configuration, data in each data switching direction becomes more recognizable visually.

5 Claims, 19 Drawing Sheets

(56) References Cited

U.S. PATENT DOCUMENTS

| | | | |
|---|---|---|---|
| 8,111,314 B2 * | 2/2012 | Lee | H04N 1/00204 348/207.99 |
| 2005/0160377 A1 * | 7/2005 | Sciammarella | G06F 3/0481 715/838 |
| 2009/0219430 A1 | 9/2009 | Okamoto et al. | |

FOREIGN PATENT DOCUMENTS

| | | | |
|---|---|---|---|
| JP | 2003101910 A * | 4/2003 | |
| JP | 2003283888 A | 10/2003 | |
| JP | 2004229073 A | 8/2004 | |
| JP | 2005080160 A | 3/2005 | |
| JP | 2005332486 A | 12/2005 | |
| JP | 2006067464 A | 3/2006 | |
| JP | 2008035388 A | 2/2008 | |
| JP | 2008152378 A | 7/2008 | |
| JP | 2012015887 A | 1/2012 | |

OTHER PUBLICATIONS

JP 2003101910 english abstract and figures.*
Ichikawa Soft Laboratory Co., Ltd., SILKYPIX Official Web Site, Improve of Combination Display, Jul. 8, 2011, [Retrieved on Apr. 14, 2015], Internet <https://web.archive.org/web/20110708063137/http://www.isl.co.jp/SILKYPIX/japanese/product/function/.
Japanese Office Action (and English translation thereof) dated Apr. 22, 2015, issued in counterpart Japanese Application No. 2013-233595.
Japanese Office Action (and English translation thereof) dated Aug. 17, 2015, issued in counterpart Japanese Application No. 2013-233595.
Japanese Office Action (and English translation thereof) dated Aug. 7, 2015, issued in counterpart Japanese Application No. 2013-233677.

* cited by examiner

FIG. 4A

| EXPOSURE=-2EV SATURATION=+20 (pid=-1, +1) | EXPOSURE=AE SATURATION=+20 (pid=0, +1) | EXPOSURE=+2EV SATURATION=+20 (pid=+1, +1) |
|---|---|---|
| EXPOSURE=-2EV SATURATION=±0 (pid=-1, 0) | EXPOSURE=AE SATURATION=±0 (pid=0, 0) | EXPOSURE=+2EV SATURATION=±0 (pid=+1, 0) |
| EXPOSURE=-2EV SATURATION=-20 (pid=-1, -1) | EXPOSURE=AE SATURATION=-20 (pid=0, -1) | EXPOSURE=+2EV SATURATION=-20 (pid=+1, -1) |

FIG. 4B

| Pid= -2,+2 | Pid= -1,+2 | Pid= 0,+2 | Pid= +1,+2 | Pid= +2,+2 |
|---|---|---|---|---|
| Pid= -2,+1 | Pid= -1,+1 | Pid= 0,+1 | Pid= +1,+1 | Pid= +2,+1 |
| Pid= -2,0 | Pid= -1,0 | Pid= 0,0 | Pid= +1,0 | Pid= +2,0 |
| Pid= -2,-1 | Pid= -1,-1 | Pid= 0,-1 | Pid= +1,-1 | Pid= +2,-1 |
| Pid= -2,-2 | Pid= -1,-2 | Pid= 0,-2 | Pid= +1,-2 | Pid= +2,-2 |

FIG. 5
SELECTION OF DISPLAY TARGET IMAGE IN PLAYBACK MODE
(A)
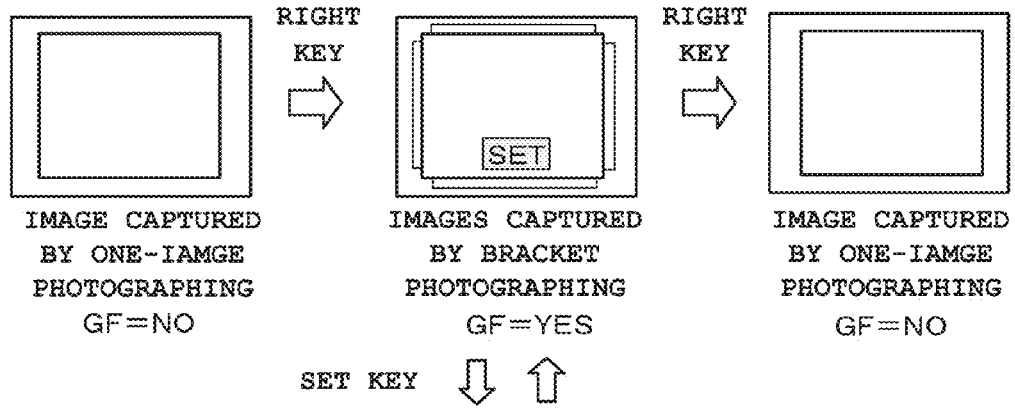
(B)
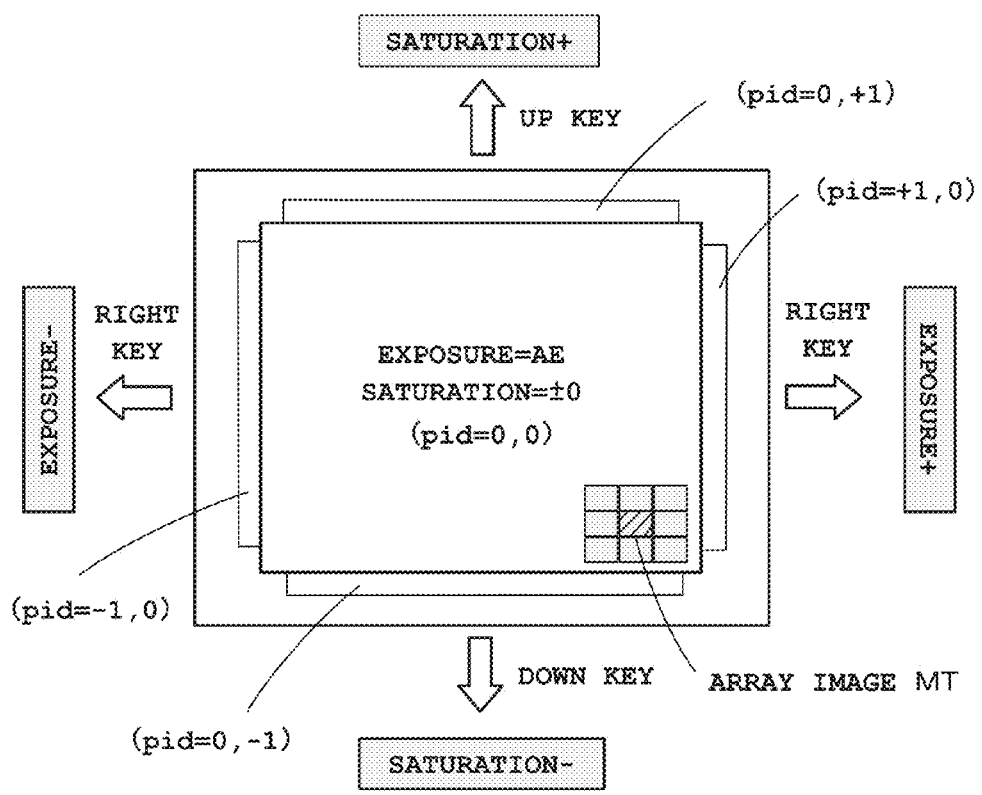

FIG. 7  CHANGE RANGE FOR BRACKET PHOTOGRAPHING IS — 3d SCENE-SPECIFIC BRACKET A TABLE
FIXED (NOT CHANGEABLE BY USER)

| SCENE | PARAMETER | PARAMETER REFERENCE VALUE (FIXED) | PARAMETER CHANGE RANGE (FIXED) | THE NUMBER OF IMAGES TO BE CAPTURED |
|---|---|---|---|---|
| PHOTOGRAPH A PETAL WITH ATTENTION TO A FOCUS POSITION (FIXED) | FOCUS | AF VALUE | ±5cm | THREE IMAGES |
| PHOTOGRAPH FOOD WITH ATTENTION TO A FOCUS POSITION (FIXED) | FOCUS | AF VALUE | ±10cm | FIVE IMAGES |
| PHOTOGRAPH A FIGURE AND A LANDSCAPE WITH ATTENTION TO A FOCUS POSITION (FIXED) | FOCUS | AF VALUE | −50cm, ∞ POSTION | THREE IMAGES |
| PHOTOGRAPH A FIGURE AND A LANDSCAPE WITH ATTENTION TO A FOCUS POSITION AND IMAGE BLURRING (FIXED) | FOCUS | AF VALUE | −50cm, ∞ POSTION | THREE IMAGES |
| | APERTURE | INTERMEDIATE POSITION | MAXIMUM AND MINIMUM APERTURES | |
| PHOTOGRAPH A LANDSCAPE WITH ATTENTION TO COLOR (FIXED) | SATURATION | INTERMEDIATE VALUE | ±50% | THREE IMAGES |
| | CONTRAST | INTERMEDIATE VALUE | ±50% | |
| PHOTOGRAPH A LANDSCAPE WITH ATTENTION TO A COLOR TONE (FIXED) | WHITE BALANCE | AWB VALUE | COLOR TEMPERATURE ±1000K | THREE IMAGES |
| PHOTOGRAPH A LANDSCAPE WITH ATTENTION TO A COLOR TONE (FIXED) | COLOR FILTER | NO FILETER | RED, BLUE, GREEN, AND YELLOW | FIVE IMAGES |
| PHOTOGRAPH A LANDSCAPE WITH ATTENTION TO A COLOR TONE AND BRIGHTNESS (FIXED) | WHITE BALANCE | AWB VALUE | COLOR TEMPERATURE ±1000K | THREE IMAGES |
| | EV | AE VALUE | ±1EV | |
| PHOTOGRAPH INDOORS WITH ATTENTION TO A COLOR TONE AND BRIGHTNESS (FIXED) | WHITE BALANCE | 4000K | COLOR TEMPERATURE ±1000K | THREE IMAGES |
| | EV | AE VALUE | ±1EV | |

FIG. 8

CHANGE RANGE FOR BRACKET PHOTOGRAPHING IS CHANGEABLE (CHANGEABLE BY USER)

3e SCENE-SPECIFIC BRACKET B TABLE

| SCENE | PARAMETER | PARAMETER REFERENCE VALUE (FIXED/CHANGEABLE) | PARAMETER CHANGE RANGE (CHANGEABLE) | THE NUMBER OF IMAGES TO BE CAPTURED |
|---|---|---|---|---|
| PHOTOGRAPH A PETAL WITH ATTENTION TO A FOCUS POSITION (CHANGEABLE) | FOCUS | AF VALUE | ±5cm or ±20cm or ±50cm | THREE IMAGES |
| PHOTOGRAPH A LANDSCAPE WITH ATTENTION TO COLOR (CHANGEABLE) | SATURATION | INTERMEDIATE VALUE | ±20% or ±50% or ±70% | THREE IMAGES |
|  | CONTRAST | INTERMEDIATE VALUE | ±20% or ±50% or ±70% |  |
| PHOTOGRAPH A LANDSCAPE WITH ATTENTION TO A COLOR TONE AND BRIGHTNESS (CHANGEABLE) | WHITE BALANCE | AWB VALUE | COLOR TEMPERATURE ±500K or ±1000K or ±1500K | THREE IMAGES |
|  | EV | AE VALUE | ±1EV or ±2EV or ±3EV |  |
| PHOTOGRAPH INDOORS WITH ATTENTION TO A COLOR TONE AND BRIGHTNESS (CHANGEABLE) | WHITE BALANCE | ±300K or ±400K or 500k | COLOR TEMPERATURE ±500K or ±1000K or ±1500K | THREE IMAGES |
|  | EV | AE VALUE | ±1EV or ±2EV or ±3EV |  |

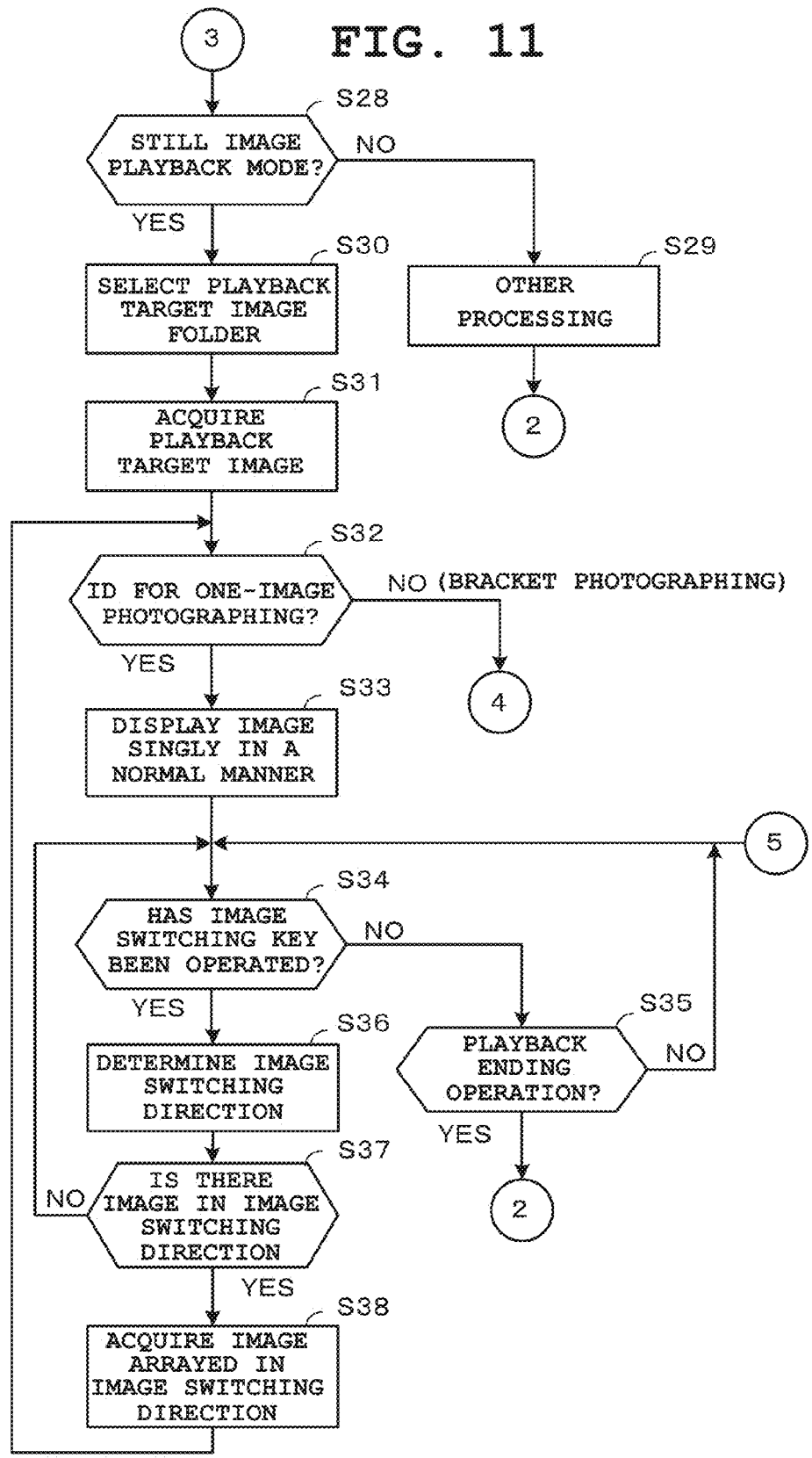

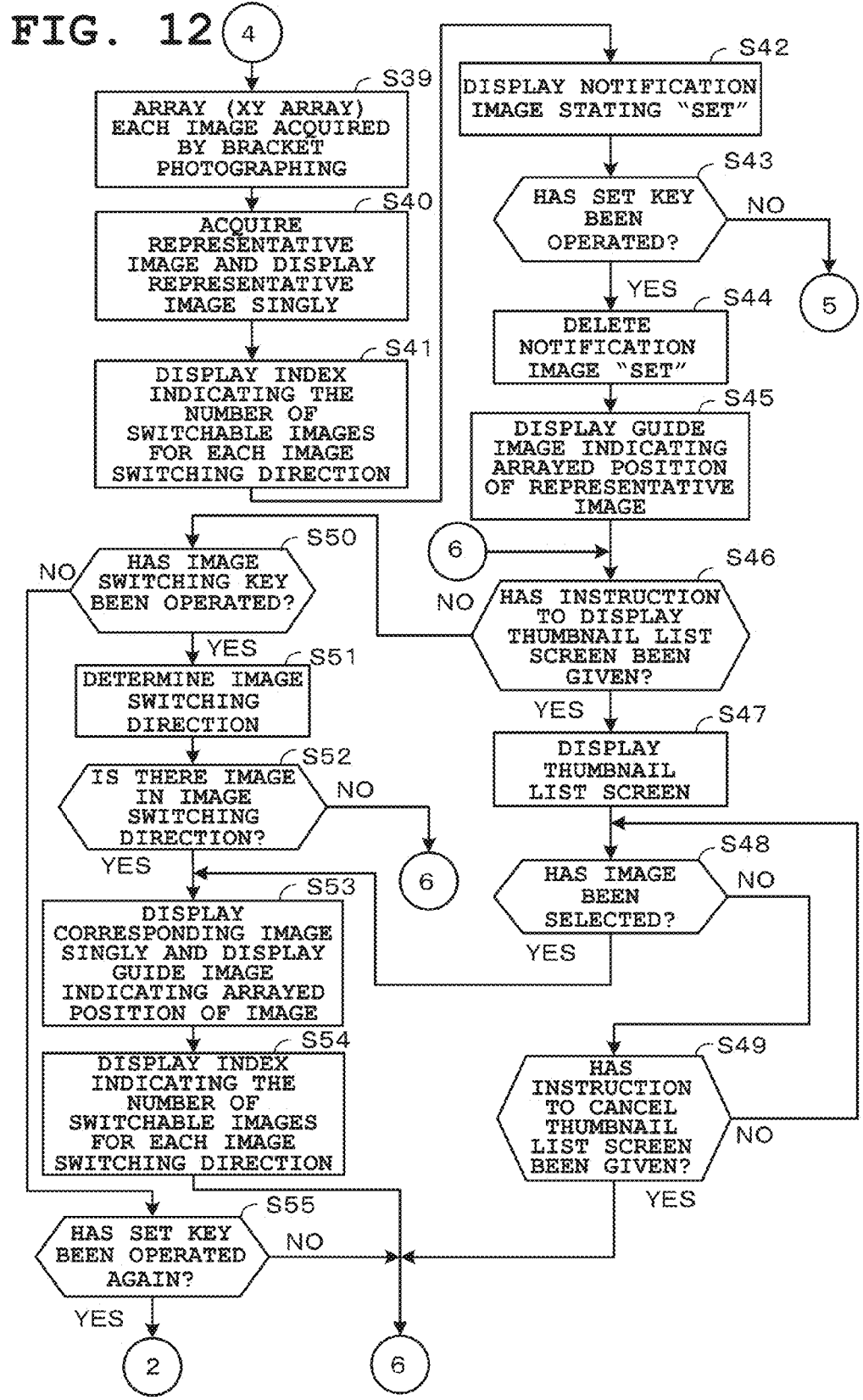

FIG. 13

SCENE SELECTION SCREEN (MENU SCREEN)

| PETAL FOCUS (FIXED) | FOOD FOCUS (FIXED) | FIGURE AND LANDSCAPE FOCUS (FIXED) | FIGURE AND LANDSCAPE FOCUS AND IMAGE BLURRING (FIXED) |
|---|---|---|---|
| LANDSCAPE COLOR (FIXED) | LANDSCAPE COLOR TONE (1) (FIXED) | LANDSCAPE COLOR TONE (2) (FIXED) | LANDSCAPE COLOR TONE AND BRIGHTNESS (FIXED) |
| INDOORS COLOR TONE AND BRIGHTNESS (FIXED/ CHANGEABLE) | PETAL FOCUS (CHANGEABLE) | LANDSCAPE COLOR (CHANGEABLE) | LANDSCAPE COLOR TONE AND BRIGHTNESS (CHANGEABLE) |
| ... | ... | ... | ... |

FIG. 14

THUMBNAIL LIST SCREEN

| IMAGE CAPTURED WITH EXPOSURE=-2EV SATURATION=+20 | IMAGE CAPTURED WITH EXPOSURE=AE SATURATION=+20 | IMAGE CAPTURED WITH EXPOSURE=+2EV SATURATION=+20 |
| --- | --- | --- |
| IMAGE CAPTURED WITH EXPOSURE=-2EV SATURATION=±0 | IMAGE CAPTURED WITH EXPOSURE=AE SATURATION=±0 | IMAGE CAPTURED WITH EXPOSURE=+2EV SATURATION=±0 |
| IMAGE CAPTURED WITH EXPOSURE=-2EV SATURATION=-20 | IMAGE CAPTURED WITH EXPOSURE=AE SATURATION=-20 | IMAGE CAPTURED WITH EXPOSURE=+2EV SATURATION=-20 |

THE NUMBER OF SWITCHABLE IMAGES IS
DISPLAYED FOR EACH DIRECTION BY
NUMERICAL NUMBERS

CONFIGURATION INCLUDING FOUR TYPES OF PARAMETERS
IN FOUR DIRECTIONS

CONFIGURATION INCLUDING FOUR TYPES OF PARAMETERS
IN EIGHT DIRECTIONS

IMAGE CAPTURED BY ONE-IMAGE PHOTOGRAPHING:
PARAMETER NAMES ARE DISPLAYED AND THE NUMBERS OF
SWITCHABLE IMAGES ARE DISPLAYED BY NUMERICAL VALUES

DATA DISPLAY APPARATUS WHICH CONTROLS DISPLAY OF A PLURALITY OF DATA, IMAGE DISPLAY APPARATUS WHICH INDIVIDUALLY DISPLAYS A SERIES OF IMAGES, DATA DISPLAY METHOD, IMAGE DISPLAY METHOD, AND STORAGE MEDIUM

CROSS-REFERENCE TO RELATED APPLICATIONS

This application is based upon and claims the benefit of priority from the prior Japanese Patent Applications No. 2013-233595 and No. 2013-233677, both filed Nov. 12, 2013, the entire contents of which are incorporated herein by reference.

BACKGROUND OF THE INVENTION

1. Field of the Invention

The present invention relates to a data display apparatus, an image display apparatus, a data display method, an image display method, and a storage medium.

2. Description of the Related Art

Generally, when the auto bracket photographing function of an imaging apparatus such as a digital still camera is activated, high-speed imaging is sequentially performed multiple times based on reference values for imaging parameters (such as exposure, white balance, and the like) and values acquired by the reference values being changed. These imaging parameters for the auto bracket photographing function include more than one type of parameter. For example, technique is known in which imaging is sequentially performed multiple times while values of plural types of imaging parameters arbitrarily selected from among parameters such as white balance, exposure, saturation, sharpness, and the like are being changed, and whereby a plurality of images whose image statuses are slightly different from each other are acquired, as shown in Japanese Patent Application Laid-Open (Kokai) Publication No. 2006-067464.

SUMMARY OF THE INVENTION

In accordance with one aspect of the present invention, there is provided a data display apparatus comprising: a data array section which arrays a plurality of data in virtual and multiple dimensions according to a plurality of criteria; an index display section which distinctly displays, as indexes for indicating that data switching can be performed in an array direction in each dimension with an arrayed position of data selected as a display target from among the plurality of data arrayed by the data array section as a starting point, information regarding an array status of the plurality of data in an array direction in each dimension, in association with plural directions in which data switching can be performed; and an updating section which, when an arbitrary direction is selected from among the plural directions in which data switching can be performed and an instruction to perform data switching in a selected direction is given, updates the display target by performing data switching in the selected direction.

In accordance with another aspect of the present invention, there is provided an image display apparatus comprising: an acquisition section which acquires a series of images obtained by capturing a same photographic subject multiple times while changing a parameter value for each of plural types of imaging parameters; a display section which displays one of the series of images acquired by the acquisition section and showing the same photographic subject; a change operation section which is used to perform a parameter-specific user operation for changing a parameter value for each of the plural types of imaging parameters; a specifying section which, when a parameter-specific user operation is performed using the change operation section, specifies from the series of images acquired by the acquisition section an image captured with a parameter value acquired by changing a parameter value of an imaging parameter of a type corresponding to the parameter-specific user operation among the plural types of imaging parameters with which an image being displayed on the display section has been captured; and a switching section which switches the image being displayed on the display section to the image specified by the specifying section.

In accordance with another aspect of the present invention, there is provided a data display method comprising: a step of arraying a plurality of data in virtual and multiple dimensions according to a plurality of criteria; a step of distinctly displaying, as indexes for indicating that data switching can be performed in an array direction in each dimension with an arrayed position of data selected as a display target from among the plurality of arrayed data as a starting point, information regarding an array status of the plurality of data in an array direction in each dimension, in association with plural directions in which data switching can be performed; and a step of, when an arbitrary direction is selected from among the plural directions in which data switching can be performed and an instruction to perform data switching in a selected direction is given, updating the display target by performing data switching in the selected direction.

In accordance with another aspect of the present invention, there is provided an image display method comprising: a step of acquiring a series of images obtained by capturing a same photographic subject multiple times while changing a parameter value for each of plural types of imaging parameters; a step of displaying one of the series of acquired images showing the same photographic subject; a step of, when a parameter-specific user operation is performed using a change operation section which is used to perform a parameter-specific user operation for changing a parameter value for each of the plural types of imaging parameters, specifying from the series of acquired images an image captured with a parameter value acquired by changing a parameter value of an imaging parameter of a type corresponding to the parameter-specific user operation among the plural types of imaging parameters with which an image being displayed on the display section has been captured; and a step of switching the image being displayed to the specified image.

In accordance with another aspect of the present invention, there is provided a non-transitory computer-readable storage medium having stored thereon a data display program that is executable by a computer, the program being executable by the computer to perform functions comprising: data array processing for arraying a plurality of data in virtual and multiple dimensions according to a plurality of criteria; index display processing for distinctly displaying, as indexes for indicating that data switching can be performed in an array direction in each dimension with an arrayed position of data selected as a display target from among the plurality of data arrayed by the data array processing as a starting point, information regarding an array status of the plurality of data in an array direction in each dimension, in association with plural directions in which data switching can be performed; and update processing for, when an arbitrary direction is selected from among the plural directions in which data switching can be performed and an instruction to perform data switching in a selected direction is given, updating the display target by performing data switching in the selected direction.

In accordance with another aspect of the present invention, there is provided a non-transitory computer-readable storage medium having stored thereon an image display program that is executable by a computer, the program being executable by the computer to perform functions comprising: acquisition processing for acquiring a series of images obtained by capturing a same photographic subject multiple times while changing a parameter value for each of plural types of imaging parameters; display processing for displaying one of the series of images acquired by the acquisition processing and showing the same photographic subject; specifying processing for, when a parameter-specific user operation is performed using a change operation section which is used to perform a parameter-specific user operation for changing a parameter value for each of the plural types of imaging parameters, specifying from the series of images acquired by the acquisition processing an image captured with a parameter value acquired by changing a parameter value of an imaging parameter of a type corresponding to the parameter-specific user operation among the plural types of imaging parameters with which an image being displayed on the display section has been captured; and switch processing for switching the image being displayed by the display processing to the image specified by the specifying processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A and FIG. 4B are diagrams showing an array status when a series of images captured by bracket photographing are virtually and two-dimensionally arrayed based on two types of imaging parameters;

FIG. 5 is a diagrams for explaining an image switching operation for selecting and individually displaying a desired image in a playback mode for captured images;

FIG. 7 is a diagram for explaining a scene-specific bracket A table 3d;

FIG. 8 is a diagram for explaining a scene-specific bracket B table 3e;

FIG. 9 is a flowchart of an operation (a characteristic operation of an embodiment) of a data display apparatus (digital camera) which is started when the power is turned on;

FIG. 11 is a flowchart of an operation following that of FIG. 10;

FIG. 12 is a flowchart of an operation following that of FIG. 11;

FIG. 13 is a diagram showing an example of a selection screen (menu screen) for selecting a scene in advance of bracket photographing;

FIG. 14 is a diagram showing a thumbnail list screen that displays a list of serial images captured by bracket photographing;

DETAILED DESCRIPTION OF THE PREFERRED EMBODIMENTS

Hereafter, an embodiment of the present invention is described with reference to FIG. 1 to FIG. 14.

Figure 1:
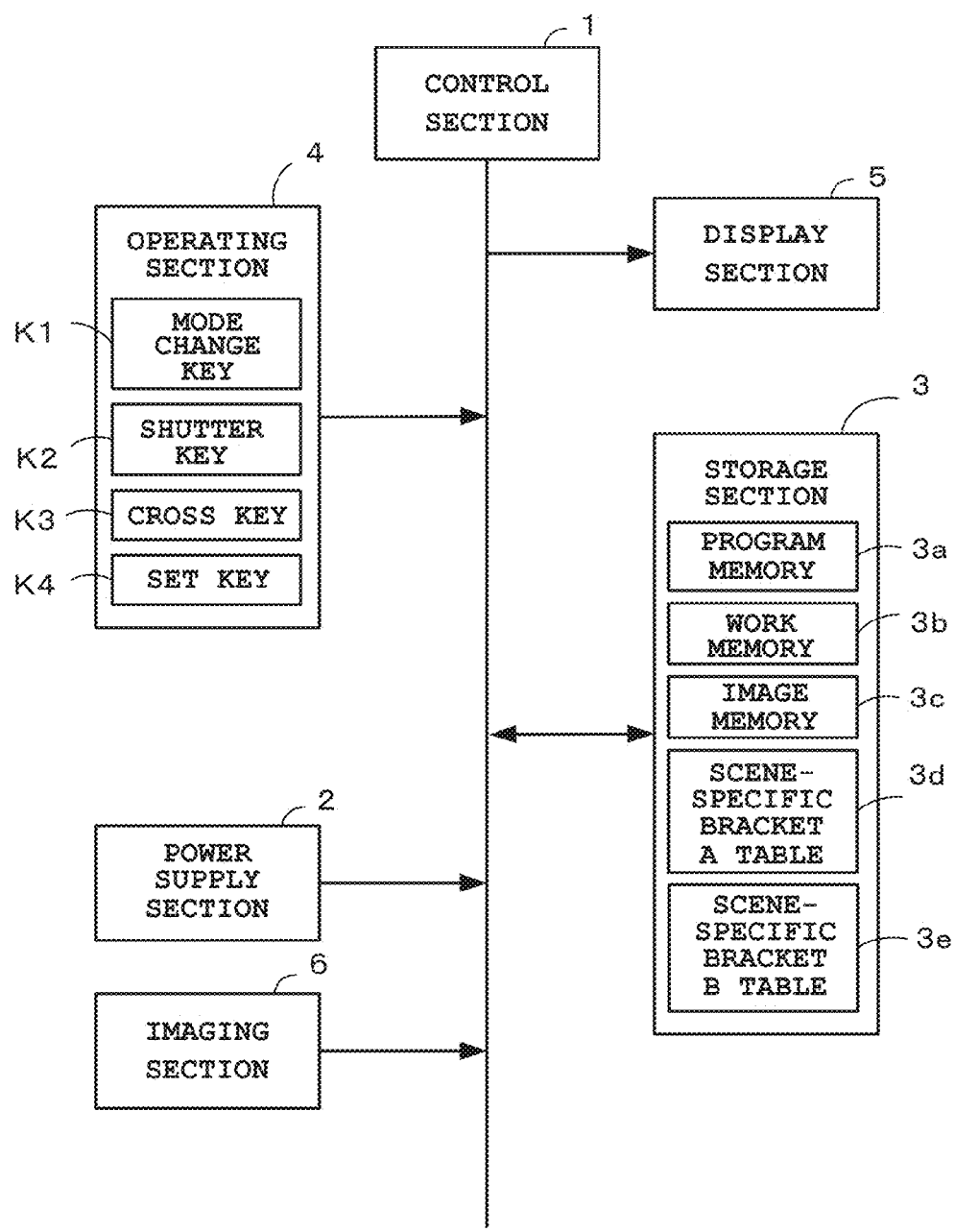
FIG. 1 is a block diagram showing basic components of a digital camera in which the present invention has been applied as a data display apparatus that displays a plurality of data individually.

In this embodiment, the present invention has been applied in a digital camera (imaging apparatus) as a data display apparatus that displays a plurality of data individually. FIG. 1 is a block diagram showing basic components of this digital camera.

This digital camera is a digital compact camera capable of capturing still images and moving images, and has a bracket photographing function as one of imaging functions, in addition to basic functions such as these imaging functions and a clock function. This bracket photographing function is a function for acquiring a plurality of images (a series of images) by sequentially capturing the same photographic subject multiple times while changing a parameter value for each type of imaging parameter by one shutter operation.

A control section 1 in FIG. 1 operates by electric power supplied from a power supply section (a secondary battery) 2, and controls the entire operation of the digital camera in accordance with various programs in a storage section 3. This control section 1 includes a CPU (Central Processing Unit), a memory, and the like not shown. The storage section 3 is structured to have a ROM (Read Only Memory), a flash memory, and the like, and includes a program memory 3a which stores programs and various applications to achieve the present embodiment according to operational procedures shown in FIG. 9 to FIG. 12 described below, a work memory 3b which temporarily stores various information (such as flags) required to operate the digital camera, an image memory 3c (such as a flash memory) for storing captured images, a scene-specific bracket A table 3d, and a scene-specific bracket B table 3e described below. Note that the storage section 3 may be structured to include a detachable portable memory (recording media) such as an SD (Secure Digital) card or an ID (Integrated Circuit) card. Although not illustrated, in a case where the storage section 3 is connected to a network by a communication function, the storage section 3 may include a storage area on the side of a predetermined server apparatus.

An operating section 4 in FIG. 1 includes press-button type various keys, such as a mode change key K1 for switching between an imaging mode and a replay mode, a two-step press-type (half-press and full-press) shutter key K2 for instructing to start imaging. This operating section 4 may further include a cross key K3 including up, down, right, and left keys (four directional key), a set key K4, and operators for setting photographing conditions, such as an exposure correction dial, a zoom ring, a focus ring, etc. The control section 1 performs processing in accordance with an input operation signal outputted by an operation key from the operating section 4. A display section 5 in FIG. 1 is a high-definition liquid-crystal display or an organic EL (Electro Luminescence) display, which serves as a monitor screen (live view screen) for displaying an image to be captured (live view image) and a replay screen for replaying a captured image. Note that the display section 5 may be constituted by a touch screen having a touch panel on a display panel.

An imaging section 6 in FIG. 1 is structured to have a lens unit such as a zoom lens, an aperture and shutter, and a focus lens, an image sensor such as a CCD (Charge Coupled Device) or a CMOS (Complementary Metal Oxide Semiconductor), various sensors, an analog processing section, and a digital processing section omitted in the drawing. Here, a photoelectrically converted image signal (analog-value signal) is subjected to color separation and gain adjustment for each RGB color component, and then converted to digital-value data. This digitally converted image data is subjected to color interpolation (demosaic processing) for full-color display on the display section 5. Then, the imaging section 6 drives the zoom lens, the aperture and shutter, and the focus lens in accordance with a control signal from the control section 1, and thereby controls zoom adjustment, focus adjustment, exposure adjustment, and the start/end of photographing, or performs optical zoom processing, focus processing, aperture adjustment processing, white balance processing, etc.

Figure 2:
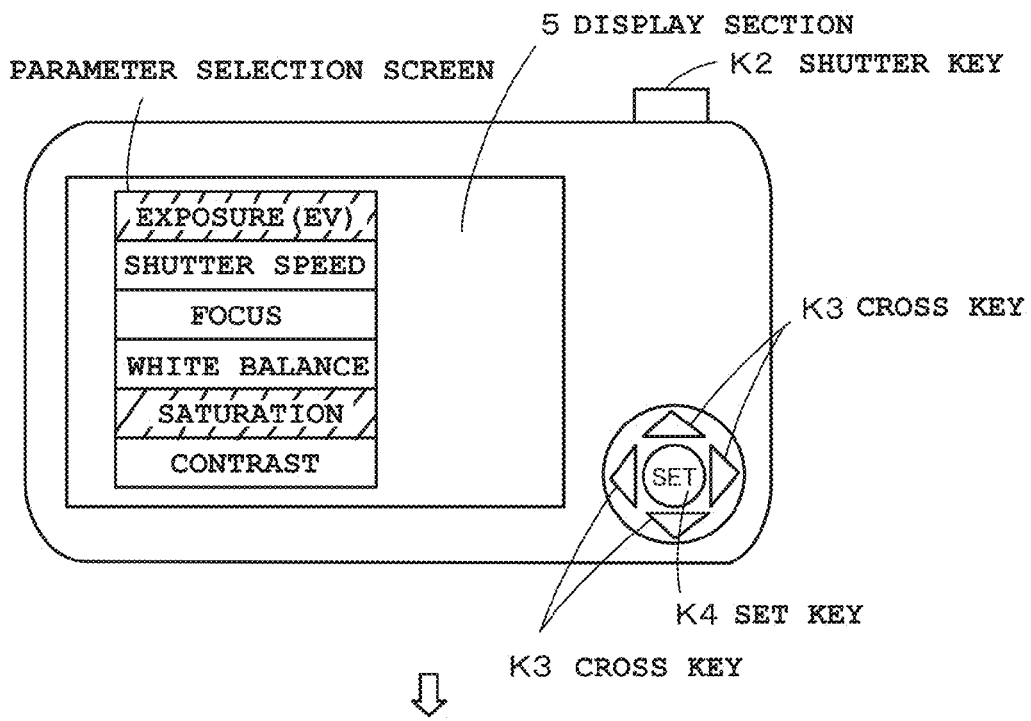
FIG. 2 is a diagram showing a selection screen for selecting change conditions (imaging parameters, reference values, change ranges, the number of images to be captured) for imaging parameters for a bracket photographing function.

FIG. 2 is a diagram showing a parameter selection screen for arbitrarily selecting types of imaging parameters, reference values, change ranges, the number of images to be captured, as change conditions for imaging parameters for the bracket photographing function.

In the example of FIG. 2, two types of imaging parameters have been selected for the bracket photographing function. Specifically, two desired types of imaging parameters have been selected by a user operation from the parameter selection screen which displays a list of various types of imaging parameters. After selecting the imaging parameters, the user performs an operation for selecting, for each parameter, a change range within which values around a reference value (a value automatically determined by an AF (autofocus) function or a predetermined fixed value) are changed, or an operation for selecting the number of images to be sequentially captured in bracket photographing. Note that three or more types of imaging parameters may be selected.

In the example of FIG. 2, items "EXPOSURE (EV)", "APERTURE", "SHUTTER SPEED", "WHITE BALANCE", "SATURATION", and "CONTRAST" have been displayed in a list on the parameter selection screen, as selection candidates for imaging parameters. However, the present invention is not limited thereto, and this list may be displayed including items such as "SHARPNESS", "ISO (International Organization for Standardization) SPEED", and "FLASH". In FIG. 2, items marked with diagonal lines are items selected by a user operation (the same applies hereinafter). In this example, "EXPOSURE (EV)" and "SATURATION" have been selected as the above-described two types of imaging parameters.

Also, in this example of FIG. 2, a screen for selecting the change range of the exposure parameter and a screen for selecting the change range of the saturation parameter have been displayed as selection screens for selecting the change ranges of imaging parameters, in which "±2EV" has been selected as an arbitrary change range from among the items "±1EV" "±2EV" and "±3EV" displayed in a list on the exposure parameter screen, and "±20%" has been selected as an arbitrary change range from among the items "±20%", "±50%", and "±70%" displayed in a list on the saturation parameter screen. In addition, in this example, items "THREE IMAGES", "FIVE IMAGES", and "SEVEN IMAGES" have been displayed in a list as selection candidates for the number of images to be captured, from which "THREE IMAGES" has been arbitrarily selected as the number of images to be captured. Note that, when selecting a desired item from among the selection candidates in the example of FIG. 2, the user operates the up and down keys of the cross key K3. Then, the user presses the set key K4 when desired selection candidates are decided.

Figure 3:
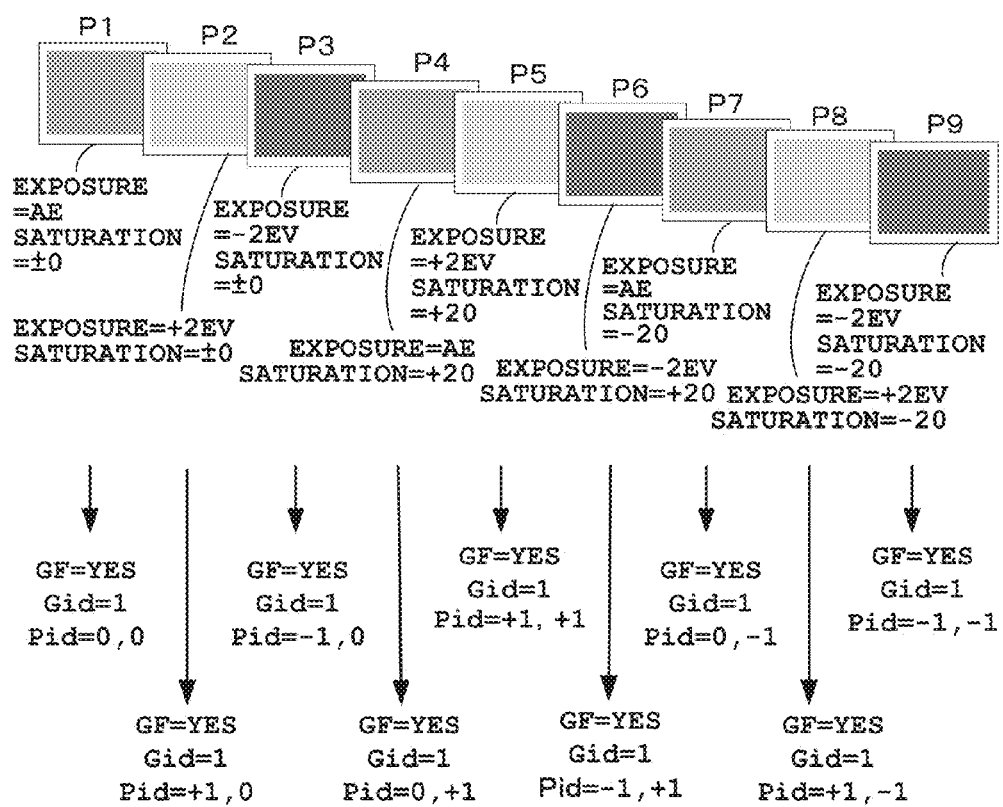
FIG. 3 is a diagram showing a plurality of images (a series of images) acquired by bracket photographing.

FIG. 3 is a diagram showing a plurality of images (a series of images) acquired by bracket photographing based on two types of imaging parameters. Specifically, a series of images have been acquired by bracket photographing in a state where "EXPOSURE" and "SATURATION" have been set as two types of imaging parameters, "±1EV" has been set as the change range of the exposure, "THREE IMAGES" has been set as the number of images to be captured for this imaging parameter, "±20%" has been set as the change range of the saturation, and "THREE IMAGES" has been set as the number of images to be captured for this imaging parameter. In this configuration, nine serial images are acquired by one shutter operation by continuous imaging for capturing plural images having different imaging parameter values of "EXPOSURE" and "SATURATION" (three images for each value). In FIG. 3, P1 to P9 indicates the images sequentially captured by bracket photographing. These nine images (serial images) are constituted by combinations of exposure parameters "AE", "+2EV", and "−2EV" and saturation parameters "±0", "+20%", and "−20%".

The first image P1 is an image captured under a condition "EXPOSURE=AE AND SATURATION=±0", and the second image P2 is an image captured under a condition "EXPOSURE=+2EV AND SATURATION=±0". Similarly, the third image P3 is an image captured under a condition "EXPOSURE=−2EV AND SATURATION=±0", and the fourth image P4 is an image captured under a condition "EXPOSURE=AE AND SATURATION=+20%". Moreover, the fifth image P5 is an image captured under a condition "EXPOSURE=+2EV AND SATURATION=+20%", . . . and the ninth image P9 is an image captured under a condition "EXPOSURE=−2EV AND SATURATION=−20%". These series of images are each provided with a group flag "GF" which indicates that images are a series of images captured by bracket photographing, a group ID "Gid" by which a series of images captured by bracket photographing are identified to be in the same group, and a parameter ID "Pid" for bracket photographing, as identification information. Note that the details of the group flag "GF" and the parameter ID "Pid" will be described later.

FIG. 4A and FIG. 4B show an arrayed state when a series of images captured by bracket photographing are virtually and two-dimensionally arrayed (biaxial arrangement), of which FIG. 4A shows a state where a series of images (nine images) captured by bracket photographing with two types of imaging parameters "EXPOSURE" and "SATURATION" being set and the number of images to be captured being set at "THREE IMAGES" have been arrayed based on the two types of imaging parameters. In this case, a first image P1 "EXPOSURE=AE AND SATURATION=±0" shown in FIG. 4B has been arrayed in the middle, the second image P2 "EXPOSURE+2EV AND SATURATION=±0" has been arranged on the right side, the third image P3 "EXPOSURE=−2EV AND SATURATION=±0" has been arranged on the left side, the fourth image P4 "EXPOSURE=AE AND SATURATION=+20%" has been arranged on the upper side, the fifth image P5 "EXPOSURE=AE AND SATURATION=−20%" has been arranged on the lower side, and so on.

In FIG. 4A and FIG. 4B, the parameters "Pid" indicate parameter IDs for bracket photographing, and the arrayed position of each image is represented by (X, Y) when a first imaging parameter is indicated in an X-axial direction and the second imaging parameter is indicated in a Y-axial direction in an X-Y coordinate system (two-dimensional coordinate system: biaxial coordinate system). That is, "Pid=0, 0" indicates an image arrayed in the middle of the array. The arrayed position of an image after one step is taken toward the plus side of the image "Pid=0, 0" is represented by "+1" and the arrayed position of an image after one step is taken toward the minus side is represented by "−1". Accordingly, the arrayed position of the first image P1 shown in FIG. 4B is "Pid=0, 0", the arrayed position of the second image P2 is "Pid=+1, 0", the arrayed position of the third image P3 is "Pid=−1, 0", the arrayed position of the fourth image P4 is "Pid=0, +1", the arrayed position of the fifth image P5 is "Pid=0, −1", and so on.

FIG. 4B is a diagram showing a state where a series of images (twenty-five images) captured by bracket photographing with the number of images to be captured being set at "FIVE IMAGES" have been two-dimensionally arrayed in the form of 5×5 grids. In this case, in the array of the images, the center position indicates "Pid=0, 0", the uppermost rightmost position indicates "Pid=+2, +2", the lowermost rightmost position indicates "Pid=+2, −2", the uppermost leftmost position indicates "Pid=−2, +2", and the lowermost leftmost position indicates "Pid=−2, −2", The arrayed position (X, Y) of each image is added as header information (various types of information regarding an image) of an image file, together with an "image capturing date", a "title", and the like.

FIG. 5 is a diagram for explaining an image switching operation for selecting and singly displaying a desired image in a playback mode for captured images. The (A) portion of FIG. 5 is a portion for explaining an image switching operation for selecting and individually displaying each image when images captured by normal photographing (one-image photographing) and a series of images captured by bracket photographing have been stored together in chronological capture order. In the diagram, group flags "GF" have been added to image files as header information, and based on which the control section 1 judges each image as to whether it is an image captured by one-image photographing or images captured by bracket photographing. Note that "GF=NO" herein indicates an image captured by one-image photographing, and "GF=YES" indicates images captured by bracket photographing.

In the example of FIG. 5 where the cross key K3 is being used as an image switching key, image switching in a forward direction has been performed by the operation of the right key. In this example, when the right key of the cross key K3 is operated once with an image captured by one-image photographing being displayed, this image is switched to images captured by bracket photographing (a representative image described later is displayed first). Then, when the right key is operated again, the current image is switched to another image captured by one-image photographing. As described above, in the present embodiment, when image switching is to be performed with a plurality of images captured by bracket photographing and images captured by one-image photographing being stored together, the images captured by bracket photographing are switched to another image in units of groups by a single key operation that is similar to an operation of switching an image captured by one-image photographing to another image.

Note that the above-described representative image for images captured by bracket photographing is a center image whose arrayed position is "Pid=0, 0". However, an arbitrarily selected representative image may be set by a user operation. When this representative image is being displayed, a predetermined notification image stating "SET" is displayed by being superimposed on the representative image. More specifically, the notification image stating "SET" is displayed by being superimposed on the representative image so as to indicate that, by the set key K4 being pressed, the representative image becomes switchable to another image among a series of images captured by bracket photographing.

The (B) portion of FIG. 5 is a portion for explaining a parameter-specific image switching operation for individually displaying each image captured by bracket photographing according to their imaging parameters.

In the (B) portion of FIG. 5, a representative image "Pid=0, 0" (EXPOSURE=AE AND SATURATION=±0) is being displayed among a series of images (nine images) captured by bracket photographing with "EXPOSURE" and "SATURATION" being set as two types of imaging parameters and "THREE IMAGES" being set as the number of images to be captured. Here, when a parameter-specific image switching operation (an operation using the up, down, right, or left key) is performed using the cross key K3, image switching is performed in a direction in which the parameter-specific image switching operation has been performed, with the arrayed position of the image being displayed (representative image at first) as a starting point. That is, when a parameter-specific image switching operation is performed using the cross key K3, an image captured with a parameter value of a type corresponding to this operation among two types of imaging parameters used in the image capturing of the image being displayed is determined as a display target, and image switching is performed such that the display target is displayed.

As described above, in the present embodiment, image switching is performed with the arrayed position of an image being displayed (a representative image at first) as a starting point. In this case, information regarding an array status is distinctly displayed for each direction so that the number of images arrayed in a direction in which the image switching is performed with the image being displayed as a starting point can be indicated. That is, as indexes for indicating the number of images switchable from the arrayed position of the image being displayed which is serving as a starting point, information regarding the array status of a series of images captured by bracket photographing is distinctly displayed corresponding to a plurality of directions in which image switching can be performed (directions in which the images have been arrayed).

The above-described information regarding the array status of a series of images (the indexes indicating the number of images by which image switching can be performed) is information that is distinctly displayed behind an image being displayed. As these indexes, switchable images are displayed for each image switching direction such that portions thereof are displayed at positions shifted from that of the image being displayed and from each other while being superimposed on one another by the number of the switchable images. This number of the superimposition for each direction is the number of the switchable images. As such, in the present embodiment, the indexes for indicating switchable images for each direction are distinctly displayed (superimposition display at shifted positions). For example, in FIG. 5, the number of switchable images in each of the upward, downward, rightward, and leftward directions is "1". Accordingly, one image is displayed behind each of the four sides of the image being displayed such that a portion thereof is located at a position shifted from the corresponding side, by which the user can clearly know that the number of switchable images in each direction is "1".

When one of the up, down, right, and left keys of the cross key K3 is operated with the image "Pid=0, 0" (EXPOSURE=AE AND SATURATION=±0) being displayed as a representative image of images captured by bracket photographing, the control section 1 designates a next image arrayed in a direction corresponding to this key operation as a display target, and switches the representative image to this target image (individual display). Note that "EXPOSURE+" described outside the frame in FIG. 5 indicates that the right key is a key for image switching in a forward direction in the exposure parameter, "EXPOSURE–" indicates that the left key is a key for image switching in the opposite direction in the exposure parameter, "SATURATION+" indicates that the up key is a key for image switching in a forward direction in the saturation parameter, and "SATURATION–" indicates that the down key is a key for image switching in the opposite direction in the saturation parameter.

That is, for example, when the right key is operated once, image switching is performed in the plus side direction of the exposure parameter, whereby an image after one step is taken from the representative image (an image "Pid=+1, 0") is displayed by switch display. When the left key is operated once, image switching is performed in the minus side direction of the exposure parameter, whereby an image after one step is taken from the representative image (an image "Pid=−1, 0") is displayed by switch display. Also, when the up key is operated once, image switching is performed in the plus side direction of the saturation parameter, whereby an image after one step is taken from the representative image (an image "Pid=0, +1") is displayed by switch display. When the down key is operated once, image switching is performed in the minus side direction of the saturation parameter, whereby an image after one step is taken from the representative image (an image "Pid=0, −1") is displayed by switch display. Note that, when the set key K4 is operated once again in the display state shown in the (B) portion of FIG. 5, the monitor re-enters the display state shown in the (A) portion of FIG. 5 in which an image captured by one-image photographing can be displayed.

Also, on a portion (the lower right corner in the example of FIG. 5) of the screen where display target images are being displayed individually, an array image MT is arranged and displayed which indicates the arrayed position of the image being displayed (the representative image at first) within the two-dimensional array, as shown in the (B) portion of FIG. 5. In this example, the array image MT has a three-by-three lattice shape (matrix form), and the center square, which is indicating the arrayed position of the image being displayed, has been distinctly displayed (by diagonal lines). Every time an image being displayed is switched to another image, the target of this distinction display (by diagonal lines) is changed to a square corresponding to the arrayed position of that image, whereby its arrayed position is clearly indicated. Note that the display position of the array image MT is not limited the above-described position on an image being individually displayed, and can be arbitrarily determined. In addition, a configuration may be adopted in which whether to display the array image MT is selectable.

Figure 6:
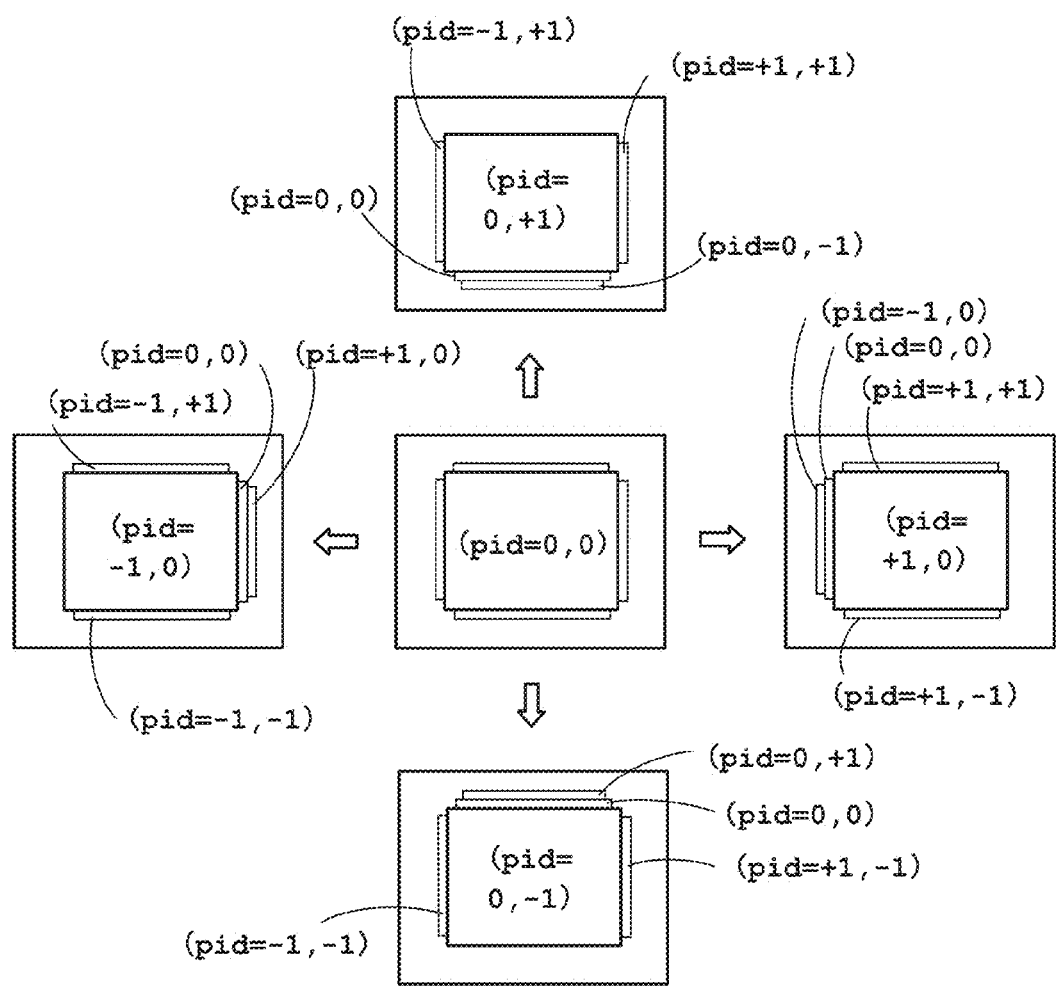
FIG. 6 is a diagram showing a display state when image switching in upward, downward, rightward, and leftward directions is performed centering on a displayed image among a series of images captured by bracket photographing.
Figure 9:
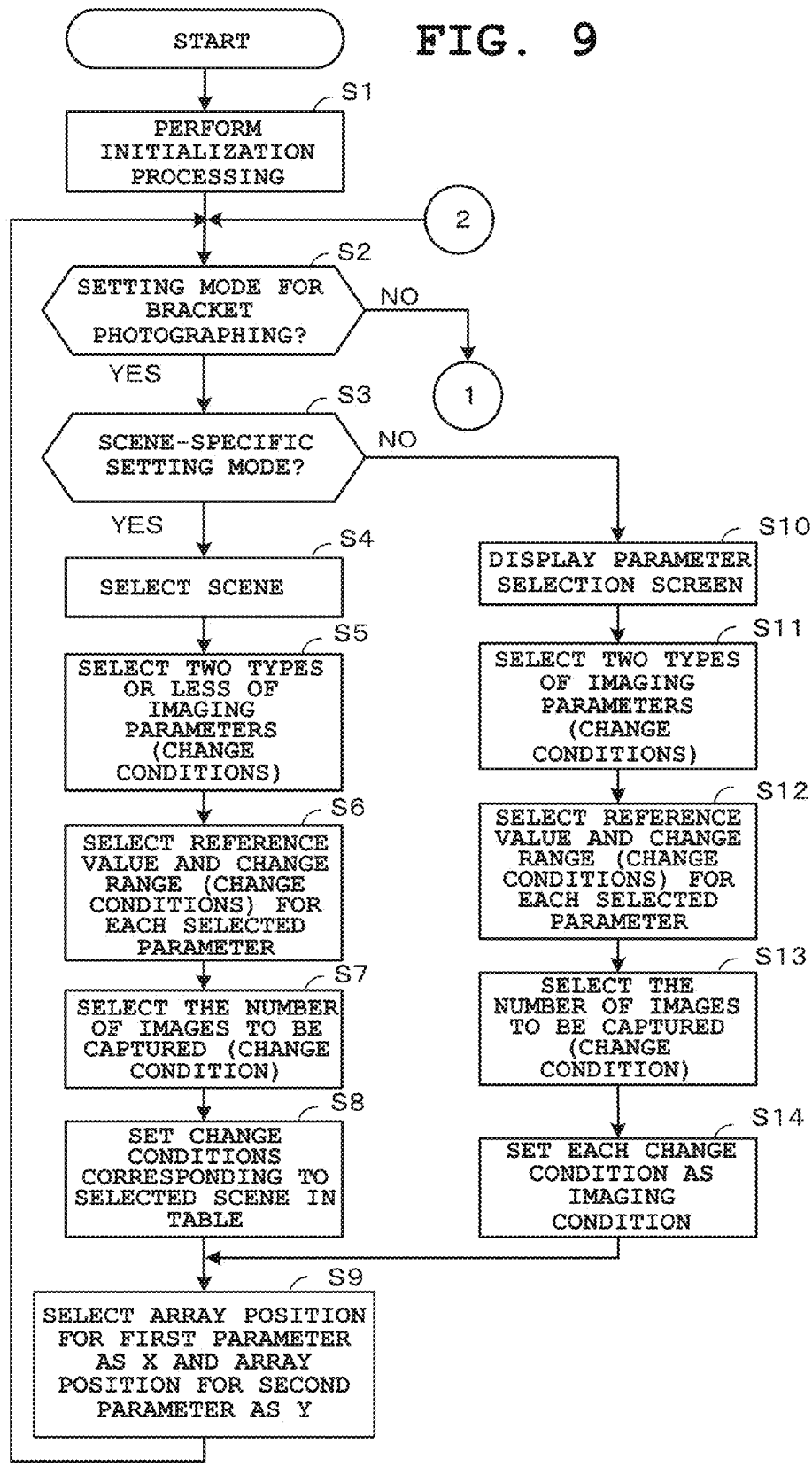
Figure 10:
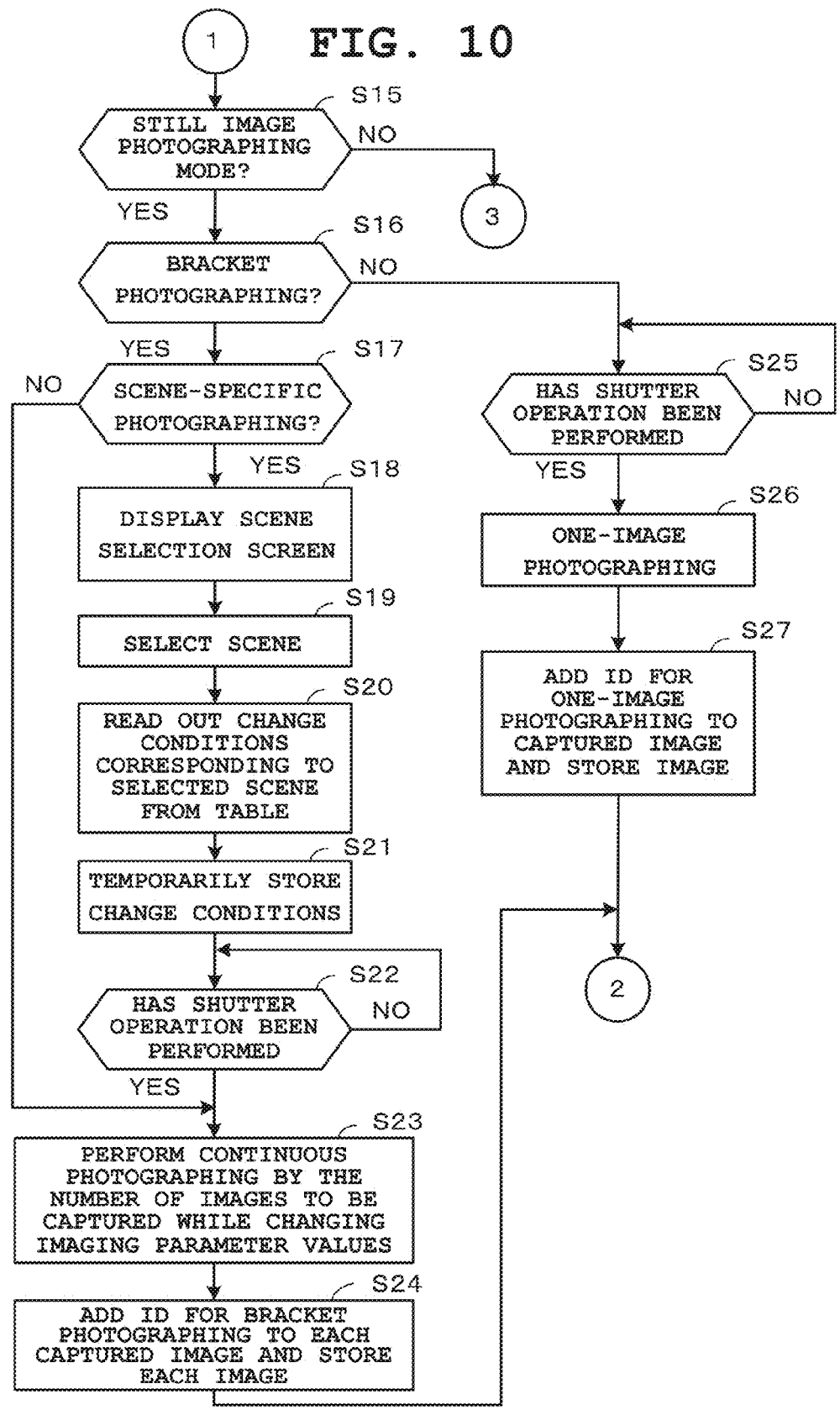
FIG. 10 is a flowchart of an operation following that of FIG. 9.

FIG. 6 is a diagram showing a display state where image switching has been performed by one step in each of the upward, downward, rightward, and leftward directions of the center image (representative image) "Pid=0, 0".

When image switching is performed rightward by one right key operation while the representative image is being displayed, the image "Pid=+1, 0" is displayed by this image switching. After this image switching, in the upward direction of the displayed image, an image "Pid=+1, +1" is located. Also, an image "Pid=+1, −1" is located in the downward direction, and the image "Pid=−1, 0" and the image "Pid=0, 0" are located in the leftward direction. Accordingly, an index for indicating the number of switchable images is distinctly displayed for each of these directions (superimposition display at shifted positions).

Similarly, when image switching is performed leftward by one left key operation while the representative image is being displayed, the image "Pid=1, 0" is displayed by this image switching. After this image switching, in the upward direction of the displayed image, an image "Pid=−1, +1" is located. Also, an image "Pid=−1, −1" is located in the downward direction, and the image "Pid=0, 0" and the image "Pid=+1, 0" are located in the rightward direction. Accordingly, an index for indicating the number of switchable images is displayed for each of these directions. These indexes for indicating the number of switchable images for each direction are also displayed when image switching to the image "Pid 0, −1" or the image "Pid=0, +1" is performed.

FIG. 7 is a diagram for explaining a scene-specific bracket A table 3d, and FIG. 8 is a diagram for explaining a scene-specific bracket B table 3e. The scene-specific bracket A table 3d and the scene-specific bracket B table 3e are tables that are referred to when bracket photographing is performed in accordance with an imaging scene arbitrarily selected by a user operation from among various types of imaging scenes set based on the type of a photographic subject and the type of image capturing. In these tables, change conditions (the types of imaging parameters, reference values, change ranges, the number of images to be captured) related to imaging parameters for the bracket photographing function are stored in association with each of the various types of imaging scenes.

The scene-specific bracket A table 3d includes fields of "SCENE", "PARAMETER", "PARAMETER REFERENCE VALUE (FIXED)", "PARAMETER CHANGE RANGE (FIXED)", and "THE NUMBER OF IMAGES TO BE CAPTURED", and the contents of which indicate that it is a fixed table that cannot be changed by a user operation, as shown in FIG. 7. The "SCENE" field is a field where details of imaging scenes are stored. For example, "PHOTOGRAPH A PETAL WITH ATTENTION TO A FOCUS POSITION (FIXED)", "PHOTOGRAPH FOOD WITH ATTENTION TO A FOCUS POSITION (FIXED)" . . . and "PHOTOGRAPH INDOORS WITH ATTENTION TO A COLOR TONE AND BRIGHTNESS (FIXED)" are stored. Note that the description "FIXED" in the "SCENE" field indicates that the contents of the "PARAMETER REFERENCE VALUE (FIXED)" field, the "PARAMETER CHANGE RANGE (FIXED)" field, and the "THE NUMBER OF IMAGES TO BE CAPTURED" field described later are fixed contents that cannot be changed.

The "PARAMETER" field, the "PARAMETER REFERENCE VALUE (FIXED)" field, the "PARAMETER CHANGE RANGE (FIXED)" field, and the "THE NUMBER OF IMAGES TO BE CAPTURED" field indicate change conditions related to imaging parameters for the bracket photographing function. In the "PARAMETER" field where parameter names indicating the types of the imaging parameters for the bracket photographing function are stored, plural types of parameter names can be stored in association with one imaging scene. For example, in this "PARAMETER" field corresponding to imaging scenes, one type of imaging parameter "FOCUS" is stored corresponding to "PHOTOGRAPH A PETAL WITH ATTENTION TO A FOCUS POSITION (FIXED)", . . . and two types of imaging parameters "WHITE BALANCE" AND "EXPOSURE (EV)" are stored corresponding to "PHOTOGRAPH A LANDSCAPE WITH ATTENTION TO A COLOR TONE (FIXED)" and "PHOTOGRAPH INDOORS WITH ATTENTION TO A COLOR TONE AND BRIGHTNESS (FIXED)".

In the "PARAMETER REFERENCE VALUE (FIXED)" field, information is stored as to whether to use automatically determined values determined by an autofocus (AF) function, an auto exposure (AE) function, an automatic white balance (AWE) function, and the like or to use fixed values set in advance (such as factory default values), as parameter reference values for bracket photographing. "AF VALUE", "AE VALUE", and "AWB VALUE" in FIG. 7 each indicate that an automatically determined value is used, and "INTERMEDIATE POSITION", "INTERMEDIATE VALUE", "NO FILTER", and "4000K" each indicate that a fixed value is used. These contents are fixed contents that cannot be changed. The control section 1 acquires these automatically determined values or fixed values as reference values for imaging parameters with reference to the scene-specific bracket A table 3d based on an imaging scene selected by a user operation.

In the "PARAMETER CHANGE RANGE (FIXED)" field, change ranges are stored within each of which values around a reference value for an imaging parameter is changed. For example, "±5 cm" is stored in the "PARAMETER CHANGE RANGE (FIXED)" field for a case where "SCENE" is "PHOTOGRAPH A PETAL WITH ATTENTION TO A FOCUS POSITION (FIXED)", "PARAMETER" is "FOCUS", and "PARAMETER REFERENCE VALUE (FIXED)" is "AF VALUE", which indicates that changes are made by plus or minus 5 cm with reference to the reference value "AF VALUE". Also, for a case where "SCENE" is "PHOTOGRAPH INDOORS WITH ATTENTION TO A COLOR TONE AND BRIGHTNESS (FIXED)", "WHITE BALANCE" and "EV" are stored as two types of "PARAMETERS", "4000K" and "AE VALUE" are accordingly stored as "PARAMETER REFERENCE VALUES (FIXED)", and "COLOR TEMPERATURE=±1000K" and "±1EV" are stored as "PARAMETER CHANGE RANGES (FIXED)", which indicate that changes are made by plus or minus 1000K with reference to the reference value "4000K" and by plus or minus 1EV with reference to the reference value "AE VALUE". In the "THE NUMBER OF IMAGES TO BE CAPTURED" field, the number of images to be captured by a plurality of imaging operations being sequentially performed while imaging parameters are being changed is stored. For example, "THREE IMAGES", "FIVE IMAGES", and the like are stored.

The scene-specific bracket B table 3e includes fields of "SCENE", "PARAMETER", "PARAMETER REFERENCE VALUE (FIXED/CHANGEABLE)", "PARAMETER CHANGE RANGE (CHANGEABLE)", and "THE NUMBER OF IMAGES TO BE CAPTURED", which indicate that it is a changeable table whose contents can be arbitrarily changed by a user operation, as shown in FIG. 8. The "SCENE" is a field where details of imaging scenes are stored, and the description "CHANGEABLE" therein indicates that the contents of the "PARAMETER REFERENCE VALUE (FIXED/CHANGEABLE)" field, the "PARAMETER CHANGE RANGE (CHANGEABLE)" field, and the "THE NUMBER OF IMAGES TO BE CAPTURED" field can be arbitrarily changed by a user operation.

The "PARAMETER" field, the "PARAMETER REFERENCE VALUE (FIXED/CHANGEABLE)" field, the "PARAMETER CHANGE RANGE (CHANGEABLE)" field, and the "THE NUMBER OF IMAGES TO BE CAPTURED" field indicate change conditions related to imaging parameters for the bracket photographing function. In the "PARAMETER" field, two types of imaging parameters, such as "SATURATION" and "CONTRAST", can be stored in association with one imaging scene. The "PARAMETER REFERENCE VALUE (FIXED/CHANGEABLE)" field indicates whether to use automatically determined values or to use preset fixed values or arbitrarily specified values. "AF VALUE", "AE VALUE", and "AWB VALUE" in FIG. 8 each indicate an automatically determined value, and "INTERMEDIATE POSITION" and "INTERMEDIATE VALUE" each indicate a fixed value. Also, "3000K/4000K/5000K" indicates a plurality of candidate values, and a value (for example, 4000K) arbitrarily specified by a user operation from among these candidates is used as a specified value.

In the "PARAMETER CHANGE RANGE (CHANGEABLE)" field, change ranges are stored within each of which values around a reference value for an imaging parameter is changed, and a value arbitrarily specified by a user operation from among a plurality of candidate values therein is used as a change range. For example, when "SCENE" is "PHOTOGRAPH A PETAL WITH ATTENTION TO A FOCUS POSITION (CHANGEABLE)" and "PARAMETER" is "FOCUS", an arbitrary change range (for example, ±20 cm) can be selected as a specified value by a user operation, from among a plurality of candidates "±5 cm/±20 cm/±50 cm" in the "PARAMETER CHANGE RANGE (CHANGEABLE)" field.

As such, the scene-specific bracket A table 3d and the scene-specific bracket B table 3e are used when bracket photographing is performed in accordance with an imaging scene. When a desired scene is selected by a user operation from among various types of scenes, the control section 1 acquires change conditions related to imaging parameters corresponding to this imaging scene with reference to a relevant table (the scene-specific bracket A table 3d or the scene-specific bracket B table 3e), and sets these change conditions as imaging conditions so as to perform bracket photographing.

As described above, the data display apparatus (digital camera) of the present embodiment includes a data array section (the control section 1 and the program memory 3a) which virtually and multi-dimensionally (for example, two dimensionally) arrays a plurality of data (a series of images captured by bracket photographing) based on various types of imaging parameters (such as exposure and saturation); an index display section (the control section 1, the program memory 3a, and the display section 5) which distinctly displays, as indexes for indicating that data switching can be performed in an array direction in each dimension with the arrayed position of data selected as a display target (data being displayed) from among the plurality of data arrayed by the data array section as a starting point, information (indexes indicating the number of images by which image switching can be performed) regarding the array status of the plurality of data in an array direction in each dimension, in association with the plural directions in which data switching can be performed; and an updating section (the control section 1, the program memory 3a) which, when an arbitrary direction is selected from among the plural directions in which data switching can be performed and an instruction to perform data switching in the selected direction is given, updates the display target by switching it to data in this direction.

Next, the operational concept of the data display apparatus (digital camera) in the present embodiment is described with reference to flowcharts shown in FIG. 9 to FIG. 12. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium.

FIG. 9 to FIG. 12 are flowcharts of an operation (a characteristic operation of the embodiment) of the data display apparatus (digital camera) which is started when the power is turned on.

First, the control section 1 performs initialization processing for clearing the memory or the like in response to a power-on operation (Step S1 in FIG. 9), and then judges whether the current mode is a setting mode for bracket photographing (Step S2), whether the current mode is a still image photographing mode (Step S15 in FIG. 10), and whether the current mode is a still image playback mode (Step S28 in FIG. 11). Here, when judged that the current mode is a mode other than these modes, such as a moving image capturing mode (NO at Step S28 in FIG. 11), the control section 1 performs processing in accordance with this mode, such as processing for setting imaging conditions for image photographing other than bracket photographing or processing for capturing a moving image (Step S29), and then proceeds to Step S2 in FIG. 9.

At Step S2, when judged that the current mode is the setting mode for bracket photographing (YES at Step S2 in FIG. 9), the control section 1 judges whether the setting of the scene-specific bracket B table 3e has been instructed as the type of this setting by a user operation (Step S3). When the scene-specific setting has been instructed (YES at Step S3), if a desired scene is selected by a user operation from a list screen showing various types of imaging scenes (Step S4), the control section 1 proceeds to processing for setting, in the scene-specific bracket B table 3e, change conditions related to changes in parameters for bracket photographing based on the selected scene (Step S5 to Step S8).

Specifically, first, an operation is performed to select two types or less of imaging parameters from the list screen showing various types of imaging scenes (Step S5). Then, when an operation for selecting a reference value and a change range for each of the selected parameters is performed (Step S6), and an operation for selecting the number of images to be captured is performed (Step S7), the control section 1 performs processing for setting, in the scene-specific bracket B table 3e, change conditions (the types of the selected parameters, the selected reference values, the selected change ranges, and the selected number of images to be captured) corresponding to the selected scene (Step S8). Here, when performing setting for the "PARAMETER REFERENCE VALUE (FIXED/CHANGEABLE)" field, the user selects an arbitrary value from among an automatically determined value, a fixed value, and a specified value. In addition, when selecting the specified value, the user further selects an arbitrary value by a user operation from among a plurality of candidate values. Note that the number of images to be captured may be set for each parameter or be set for each scene.

Then, in order to arbitrarily associate the two types of image parameters selected as described above with image switching directions (image array directions), the control section 1 performs processing for setting one of the two types of parameters as a first parameter, selecting an array direction for this first parameter as "X", setting the other parameter as a second parameter, and selecting an array direction for this second parameter as "Y", in an XY coordinate system (two-dimensional coordinate system) (Step S9), and then returns to Step S2. Note that, in a case where one type of imaging parameter has been selected, it is identified as a first parameter whose array direction is "X".

In the setting mode for bracket photographing (YES at Step S2), when the scene-specific setting is not instructed (NO at Step S3), the control section 1 performs processing for sequentially setting change conditions related to changes in parameters for bracket photographing (Steps S10 to S14). That is, in a state where the parameter selection screen in FIG. 2 is being displayed (Step S10), when an operation for selecting two types of parameters from the screen (Step S11), an operation for selecting a reference value and a change range for each of the selected parameters (Step S12), and an operation for selecting the number of images to be captured (Step S13) are performed, the control section 1 performs processing for setting imaging conditions in the imaging section 6 based on the types of the selected parameters, the selected reference values, the selected change ranges, and the selected number of images to be captured (Step S14). Note that the number of images to be captured may be set for each imaging parameter. Then, the control section 1 performs processing for setting one of the two types of parameters as a first parameter, selecting the array direction of this first parameter as "X", setting the other parameter as a second parameter, and selecting the array direction of this second parameter as "Y" (Step S9), and returns to Step S2. In this case as well, when only one type of imaging parameter has been selected, it is identified as a first parameter whose array direction is "X".

At Step S15, when the current mode is the still image photographing mode (YES at Step S15 in FIG. 10), the control section 1 judges whether the bracket photographing function has been activated (Step S16). When judged that the bracket photographing function has been activated (YES at Step S16), the control section 1 judges whether scene-specific bracket photographing has been selected by a pre-determined operation (Step S17). Then, when judged that scene-specific bracket photographing has been selected (YES at Step S17), the control section 1 performs processing for displaying a scene selection screen (menu screen) showing a list of scene-specific sample images for bracket photographing (Step S18).

FIG. 13 is a diagram showing an example of the scene selection screen (menu screen) that is displayed in advance of bracket photographing. This scene selection screen is a screen that is used by the user to select an arbitrary imaging scene from among various types of imaging scenes. The list of the screen shows samples of images acquired by various types of imaging scenes being captured using parameters for bracket photographing corresponding to these imaging scenes. Note that the description "(FIXED)" in the diagram indicates samples of images generated in accordance with the contents of the scene-specific bracket A table 3d, and the description "(CHANGEABLE)" in the diagram indicates samples of images generated in accordance with the contents of the scene-specific bracket B table 3e. As shown in the diagram, the sample images displayed on the scene selection screen are thumbnail images of the same size arranged in matrix form. Note that, in the list of the scene selection screen, scene names may be displayed in addition to the sample images such that each scene name is paired with a corresponding sample image.

When a desired imaging scene is selected from the scene selection screen for bracket photographing (Step S19), the control section 1 reads out change conditions related to imaging parameters corresponding to this imaging scene from the scene-specific bracket A table 3d or the scene-specific bracket B table 3e (Step S20), and temporarily stores them in the work memory 3b (Step S21). In this state, when the shutter key K2 is operated (YES at Step S22), the control section 1 starts bracket photographing, and thereby performs continuous photographing by the number of images to be captured while changing imaging parameter values corresponding to the scene based on the change conditions related to the imaging parameters in the work memory 3b (Step S23).

Next, the control section 1 performs compression processing on each captured image acquired by the continuous photographing (bracket photographing), and adds to the header information of each image file a group flag "GF" indicating that they are a series of images captured by bracket photographing, a group ID "Gid" by which these serial images captured by bracket photographing are identified to be in the same group, and a parameter ID for bracket photographing "Pid" as identification information for bracket photographing (Step S24). In this case, for example, "GF=YES" is added as the group flag and "Gid=1" is added as the group ID. Then, the control section 1 returns to Step S2 in FIG. 9.

Also, when the bracket photographing function has been deactivated (NO at Step S16) in the still image photographing mode (YES at Step S15), if the shutter key K2 is operated (YES at Step S25), the control section 1 performs one-image photographing under set photographing conditions (Step S26). Subsequently, the control section 1 performs compression processing on a captured image acquired by the one-image photographing, and adds a group flag "GF" to the header information of this image file as identification information for one-image photographing (Step S27). In this case, "GF=NO" is added as the group flag. Then, the control section 1 returns to Step S2 in FIG. 9.

Also, in the still image playback mode (YES at Step S28 in FIG. 11), when a date, a title, and the like are inputted by a user operation for specifying a playback target, the control section 1 selects an image folder corresponding to the inputted information as a playback target (Step S30), and selects and acquires a first image file in the image folder as a playback target (Step S31). Then, the control section 1 judges whether the group flag GF of the image selected and acquired as a playback target is "NO", or in other words, judges whether this image is an image acquired by one-image photographing (Step S32). Here, when judged that the group flag GF is "GF=NO", or in other words, the first image is an image acquired by one-image photographing as in the case of the (A) portion of FIG. 5 (YES at Step S32), the control section 1 proceeds to processing for displaying the image singly in a normal manner (one-image display) (Step S33).

Then, the control section 1 judges whether the cross key K3 serving as an image switching key has been operated (Step S34), and judges whether an ending operation for ending the playback mode has been performed (Step S35). Here, when judged that an ending operation for ending the playback mode has been performed (YES at Step S35), the control section 1 return to Step S2 in FIG. 9. When judged that the cross key K3 has been operated for instructing to perform image switching in chronological capture order (YES at Step S34), the control section 1 determines a direction in which the image switching is performed (for example, horizontal direction) based on the type of the operated key (Step S36), and judges whether there is an image in the determined direction (Step S37).

Then, when judged there is no image in the determined direction (NO at Step S37), the control section 1 returns to the above-described Step S34 without responding to the image switching operation. Conversely, when judged that there is an image in the determined direction (YES at Step S37), the control section 1 selects and acquires this image in the image switching direction as a playback target (Step S38). In this embodiment, when the right key of the of the cross key K3 is operated, a next image in a forward direction with respect to an image being displayed is selected and acquired as a playback target. Conversely, when the left key is operated, a next image in the opposite direction with respect to the image being displayed is selected and acquired as a playback target. Then, the control section 1 returns to the above-described Step S32 and judges whether the image selected and acquired as a playback target is an image captured by one-image photographing. Hereafter, each time an image selected and acquired as a playback target is judged to be an image captured by one-image photographing (YES at Step S32), the control section 1 repeats the above-described operations (Step S33 to Step S38).

Here, in a case where an image such as the second image shown in the (A) portion of FIG. 5 has been selected as a playback target, since the group flag thereof is "GF YES", or in other words, since this is a case where images captured by bracket photographing have been selected as playback targets (NO at Step S32), the control section 1 proceeds to Step S39 in FIG. 12, and performs processing for virtually and two-dimensionally arraying (XY array) each of these images (serial images) acquired by bracket photographing. In this case, by the processing for virtually and two-dimensionally arraying the series of images, these images (serial images) are arrayed in, for example, three-by-three matrix form such as that shown in FIG. 4A or five-by-five matrix form such as that shown in FIG. 4B.

Next, the control section 1 acquires an image "Pid=0, 0" positioned at the center of the two-dimensional array as a representative image, and displays it singly (Step S40), Subsequently, the control section 1 displays, in areas behind the representative image, the above-described indexes indicating the number of switchable images (the number of images by which image switching can be performed) for each image switching direction (superimposition display at shifted positions) (Step S41). Then, the control section 1 displays a notification image stating "SET" on the representative image so as to prompt the user to operate the set key (Step S42), as shown in a display state in the (A) portion of FIG. 5.

In this state, the control section 1 judges whether the set key K4 has been operated (Step S43). When judged that the set key K4 has not been operated (NO at Step S43), the control section 1 returns to Step S34 in FIG. 11. Conversely, when judged that the set key K4 has been operated (YES at Step S43), the control section 1 deletes the notification image "SET" (Step S44) and displays, in an area on the screen (the lower right corner in this case), an array image MT indicating the arrayed position of the image being displayed (the representative image in this case) in the two-dimensional array (Step S45), as shown in the display state in the (B) portion of FIG. 5.

Then, the control section 1 judges whether a user operation has been performed to instruct to display a thumbnail list screen for showing a list of each image captured by bracket photographing (Step S46), judges whether the cross key K3 serving as an image switching key has been operated (Step S50), and judges whether the set key K4 has been operated again (Step S55). Here, when judged that an instruction to display the thumbnail list screen has been given (YES at Step S46), the control section 1 switches the current screen to the thumbnail list screen for showing a list of each image captured by bracket photographing (Step S47). FIG. 14 is a diagram showing an example of the thumbnail list screen, which is displaying a list of a series of images (nine images) captured by bracket photographing with two types of imaging parameters "EXPOSURE" and "SATURATION" being set and the number of images to be captured being set at "THREE IMAGES" as in the case of FIG. 4A. When an arbitrary image is selected from this thumbnail list screen as a display target by a user operation (YES at Step S48), the control section 1 proceeds to Step S53 and switches the current display to the individual display of the selective image. At Step S48, when the judgment result is NO, the control section 1 judges whether an instruction to cancel the thumbnail list screen has been given (Step S49). Then, when judged that an instruction to cancel the thumbnail list screen has been given (YES at Step S49), the control section 1 returns to the above-described Step S46.

At Step S50, when judged that the cross key K3 serving as an image switching key has been operated (YES at Step S50), the control section 1 determines the direction of image switching based on the operated key (Step S51). That is, the control section 1 determines in which of the upward, downward, rightward, and leftward directions image switching has been requested to be performed, based on which of the up, down, right, and left keys the user has operated. Then, the control section 1 judges whether there is an image in the determined direction where image switching is performed starting from the image being displayed (the representative image in this case) among the series of images in the two-dimensional array (Step S52) When judged that there is no image (NO at Step S52), the control section 1 returns to the above-described Step S46 without responding to the image switching operation.

Conversely, when judged that there is an image in the requested image switching direction (YES at Step S52), the control section 1 acquires this image, and after singly displaying it, arranges and displays in an area on the screen an arrangement image MT indicating the arrayed position of the displayed image in the two-dimensional array (Step S53). Then, the control section 1 displays, in areas behind the image being displayed, indexes indicating the number of switchable images (the number of images by which image switching can be performed) for each image switching direction (superimposition display at shifted positions) (Step S54), and returns to the above-described Step S46. Hereafter, each time the cross key K3 serving as an image switching key is operated (YES at Step S50), the control section 1 repeats the above-described operations (Step S51 to Step S54).

As a result of this configuration, when image switching is performed in an upward, downward, rightward, or leftward direction with an image "Pid=0, 0" (representative image) being displayed as shown in FIG. 6, a next image in this image switching direction is singly displayed. That is, when image switching in the rightward direction is performed from the representative image, an image "Pid=+1, 0" is displayed by this switching. When image switching in the leftward direction is performed, an image "Pid=−1, 0" is displayed by this switching. When image switching in the downward direction is performed, an image "Pid=0, −1" is displayed by this switching. When image switching in the upward direction is performed, an image "Pid=0, +1" is displayed by this switching. Note that, when image switching in the opposite direction is performed after these operations, the representative image "Pid=0, 0" is displayed again.

Also, for example, when the image "Pid=+1, 0" is being displayed singly, there are two images in the leftward direction. Accordingly, when an image switching operation in this direction is performed twice, the image "Pid=0, 0" is displayed and then the image "Pid=−1, 0" is displayed by the image switching. Similarly, when the image "Pid=0, −1" is being displayed singly, there are two images in the upward direction. Accordingly, when an image switching operation in this direction is performed twice, the image "Pid=0, 0" is displayed and then the image "Pid=0, +1" is displayed by the image switching. Then, when the set key K4 is operated again (YES at Step S55), the control section 1 returns to Step S2 in FIG. 9.

As described above, the control section 1 of the present embodiment distinctly displays, as indexes for indicating that data (image) switching can be performed from a starting point that is the arrayed position of an image selected as a display target from among a plurality of images arrayed in virtual and multiple dimensions (multiple axes) based on plural types of imaging parameters, information regarding the array status of the plurality of images, in association with plural directions in which image switching can be performed. As a result of this configuration, when instructing to perform image switching in a direction arbitrarily selected from among a plurality of image switching directions, the user can instruct to perform image switching while visually checking information regarding the array statuses of images for each image switching direction. That is, by this configuration, images in each image switching direction become more recognizable visually. Accordingly, when individually checking the contents of a number of images in detail, the user can check them efficiently. That is, the operability and the convenience of the present embodiment are high.

Also, the above-described information regarding the array status of a plurality of images is the number of images by which image switching in each image switching direction can be performed starting from a displayed image selected as a display target, and the number of images by which image switching can be performed is displayed in association with each of the image switching directions. As a result of this configuration, the user can instruct to perform image switching while visually checking the number of switchable images for each image switching direction.

Moreover, in the present embodiment, when switchable images are to be displayed for each direction as indexes indicating information regarding the array status of a plurality of images, these switchable images are displayed behind an image being displayed such that portions thereof are located at positions shifted from that of the image being displayed and from each other while being superimposed on one another by the number of these switchable images. As a result of this configuration, the user can intuitively and visually check the contents of switchable images and the number of the switchable images for each direction.

Furthermore, the above-described plurality of images are a plurality of images captured by bracket photographing in which a plurality of imaging operations are sequentially performed while plural types of imaging parameters are being changed. That is, the user can visually and more easily check how captured images are changed by imaging parameters being changed, which improves his or her photographing skill.

Still further, in the present embodiment, imaging parameters for bracket photographing and the number of images to be captured can be arbitrarily set, by which desired bracket photographing can be performed and various changes in images can be checked.

Yet still further, in the present embodiment, the number of images to be captured can be arbitrarily set for each imaging parameter, by which settings for bracket photographing can be configured in detail.

Yet still further, in the present embodiment, when image switching is to be performed with a plurality of images captured by bracket photographing and images captured by one-image photographing being stored together, the images captured by bracket photographing are switched to another image in units of groups by a single key operation that is similar to an operation of switching an image captured by one-image photographing to another image. As a result of this configuration, even when a number of images have been captured by bracket photographing, they can be switched to another image by one switching operation. That is, image switching can be smoothly performed for all of the images including those captured by one-image photographing, as compared to a configuration where images captured by bracket photographing are switched to another image one by one each time an image switching operation is performed. Accordingly, two types of playback modes, such as a playback mode for images captured by bracket photographing and a playback mode for images captured by one-image photographing, are not required in the present embodiment, and images captured by bracket photographing can be easily found without these playback modes.

Yet still further, in the present embodiment, correspondence relation between plural types of imaging parameters for bracket photographing and a plurality of image switching directions can be arbitrarily set. Accordingly, user-friendly image switching can be performed, which improves the operability.

Yet still further, in the present embodiment, the display manner of a plurality of images can be switched between list display and individual display, which is convenient when, for example, the user checks the entire outline of a plurality of images and then checks each image in detail.

Yet still further, in the present embodiment, the array image MT, which indicates the arrayed position of an image being displayed within a two-dimensional array, is arranged and displayed on a portion of a screen where display target images are being displayed individually. As a result of this configuration, the user can intuitively check the arrayed position of an image being displayed.

Figure 15A:
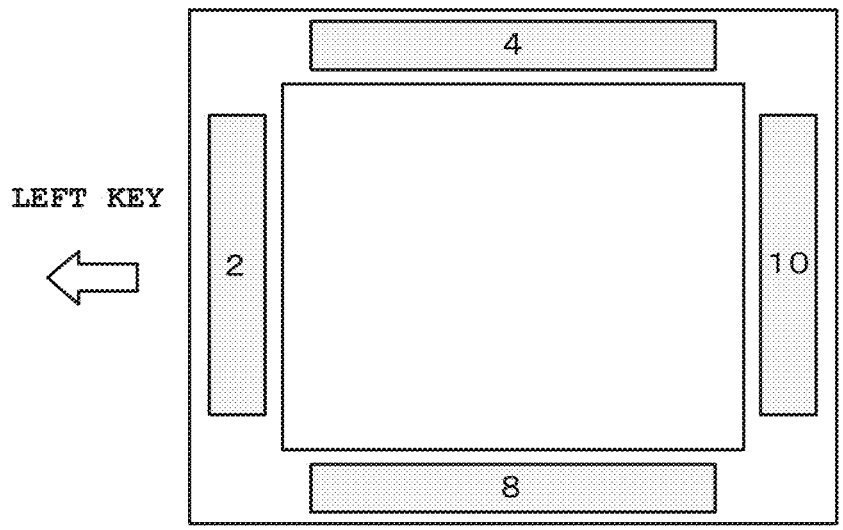
FIG. 15A and FIG. 15B are diagrams showing a modification example of the embodiment, in which the number of switchable images is displayed as a numerical value for each direction.
Figure 15B:
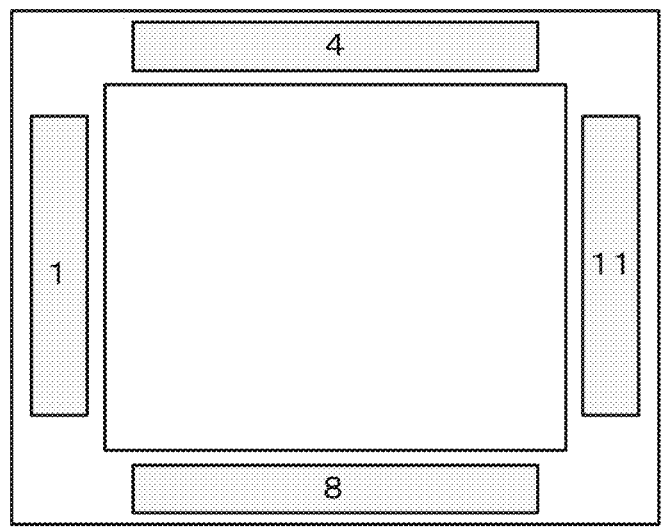

In the present embodiment, switchable images are displayed behind an image being displayed such that portions thereof are displayed at positions shifted from that of the image being displayed and from each other while being superimposed on one another by the number of the switchable images (superimposition display at shifted positions). However, a configuration may be adopted in which the number of images by which image switching can be performed is displayed for each direction by use of numerical values. FIG. 15A and FIG. 15B are diagrams showing examples where the number of images by which image switching can be performed has been displayed using a numerical value. Here, the number of images by which image switching can be performed is displayed corresponding to each of the four directions (upward, downward, rightward, and leftward directions) of an image being displayed, by use of numerical values (indexes). That is, a rectangular label is arranged close to each of the upper, lower, right, and left sides of an image being displayed, and the number of images by which image switching can be performed is displayed within each label by use of a numerical value.

The example of FIG. 15A indicates that the number of images by which image switching in a rightward direction can be performed from an image being displayed is "ten", the number of images by which image switching in a leftward direction can be performed is "two", the number of images by which image switching in an upward direction can be performed is "four", and the number of images by which image switching in a downward direction can be performed is "eight", using numerical values. In this state, when the left key of the cross key K3 is operated once, image switching in the leftward direction is performed once, whereby the display of the left index is changed to "one" and the display of the right index is changed to "eleven", as shown in FIG. 15B. By this configuration being adopted in which a numerical value indicating the number of switchable images is displayed for each direction as an index indicating information regarding the array status of a plurality of images, a large number of switchable images can be displayed at once.

Figure 16A:
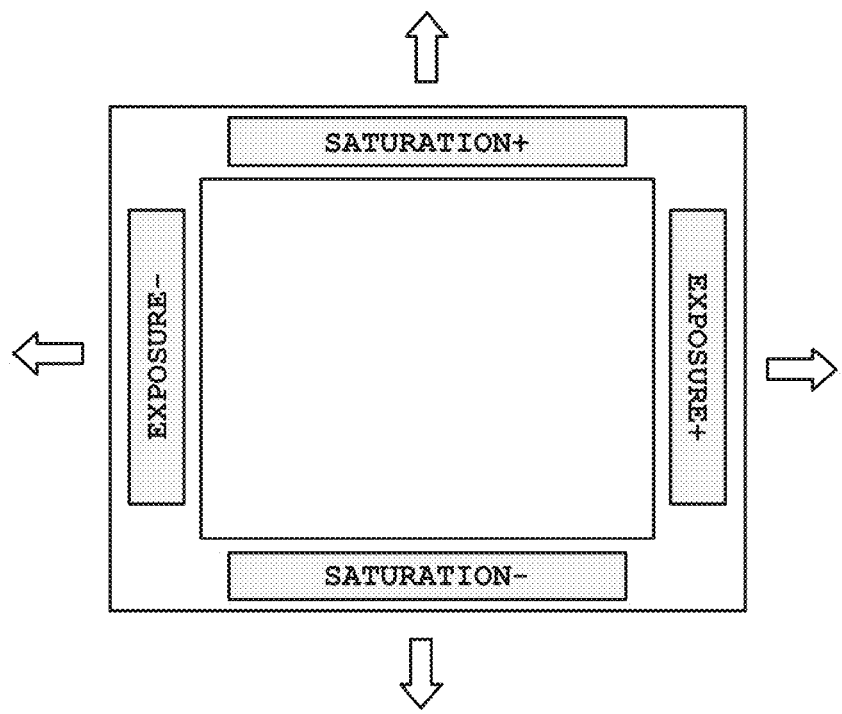
FIG. 16A and FIG. 16B are diagrams for explaining a modification example of the embodiment, in which other information has been combined with index display for parameter names.
Figure 16B:
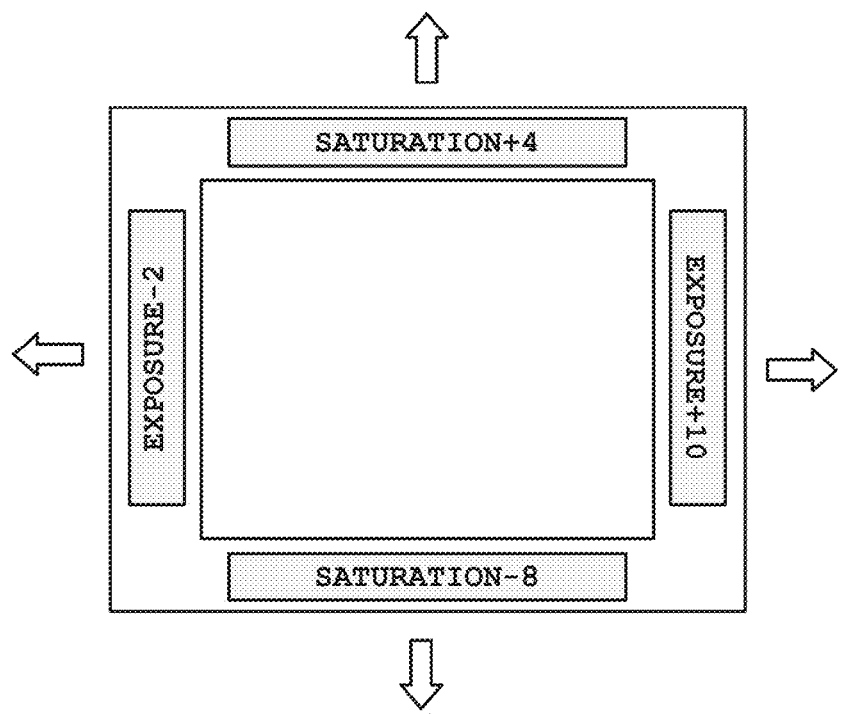

FIG. 16A is a diagram for explaining a modification example of the present embodiment, in which parameter names have been displayed as indexes. In the diagram, the plus sign "+" indicating image switching in a forward direction starting from an image being displayed and the minus sign "−" indicating image switching in the opposite direction have been added to the parameter names and displayed. That is, "EXPOSURE+" in the diagram is an index indicating image switching in a forward direction in an exposure parameter, and "EXPOSURE−" is an index indicating image switching in the opposite direction in the exposure parameter. Also, "SATURATION+" in the diagram is an index indicating image switching in a forward direction in a saturation parameter, and "SATURATION−" is an index indicating image switching in the opposite direction in the saturation parameter. In the example of FIG. 16B, the number of images by which image switching can be performed has been added to each of the parameter names including the signs indicating the image switching directions in FIG. 16A, and displayed. Here, the number of images by which image switching can be performed in the forward direction in the exposure parameter with the image being displayed as a starting point is ten, the number of images by which image switching can be performed in the opposite direction in the exposure parameter is two, the number of images by which image switching can be performed in the forward direction in the saturation parameter is four, and the number of images by which image switching can be performed in the opposite direction in the saturation parameter is eight.

In the above-described embodiment, image switching operations are performed in relation to two types of imaging parameters. However, a configuration may be adopted in which image switching operations are performed in relation to more types of imaging parameters.

Figure 17A:
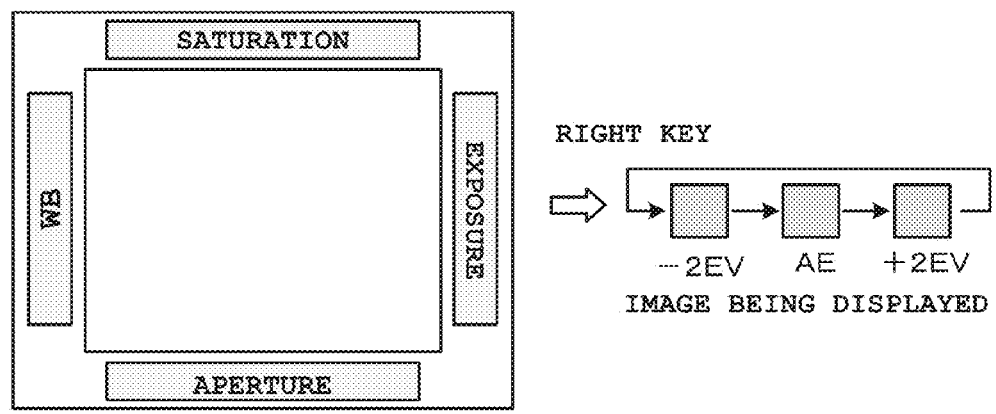
FIG. 17A and FIG. 17B are diagrams for explaining a modification example of the embodiment, in which four types of parameters have been displayed.

FIG. 17A is a diagram showing an example where image switching operations are performed in four direction in relation to four types of imaging parameters. Specifically, it is a diagram showing an example in which, when indexes indicating information regarding the array status of a plurality of images are to be displayed for each direction at the time of playback, a plurality of image switching directions are associated with plural types of parameters one to one and different types of parameter names are displayed corresponding to these image switching directions. Here, these parameter names are displayed corresponding to four directions (upward, downward, rightward, and leftward directions) relative to an image being displayed. The display of these parameter names for each direction indicates that, for example, an image captured with a changed "EXPOSURE" parameter value is displayed by image switching in the rightward direction relative to the image being displayed, an image captured with a changed "WB (white balance)" parameter value is displayed by image switching in the leftward direction, an image captured with a changed "SATURATION" parameter value is displayed by image switching in the upward direction, and an image captured with a changed "APERTURE" parameter value is displayed by image switching in the downward direction.

In this case, each time the cross key K3 serving as an image switching key is operated, the control section 1 sequentially and seamlessly switches images in the corresponding direction by the number of the images and thereby displays each image. For example, when the right key is operated once while the image (EXPOSURE=−2EV) is being displayed, a next image (EXPOSURE=AE) is displayed by being switched therefrom. Subsequently, an image (EXPOSURE=+2EV) following this image is displayed by image switching by the second operation, and then the first image (EXPOSURE=−2EV) is displayed again by image switching by the third operation. By this configuration being adopted in which imaging parameters are displayed corresponding to each image switching direction when indexes indicating information regarding the array status of a plurality of images are displayed, the imaging parameters can be identified by the image switching directions, whereby the operability is improved.

Figure 17B:
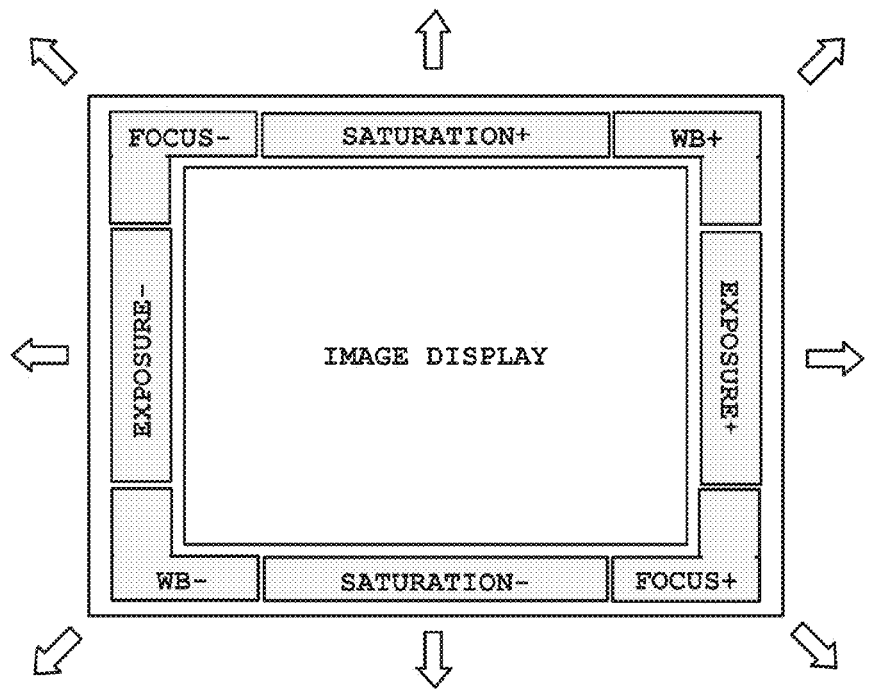

FIG. 17B is a diagram showing an example where image switching operations are performed in eight direction in relation to four types of imaging parameters. Specifically, it is a diagram showing an example where four types of imaging parameters are associated with upward and downward directions, rightward and leftward directions, upper left and lower right directions, and upper right and lower left directions, respectively, and the imaging parameter names including signs indicating the image switching directions are displayed. In FIG. 17B, parameters in the rightward and leftward directions relative to the image being displayed are "EXPOSURE+" and "EXPOSURE−", parameters in the upper right and lower left directions are "WB (white balance)+" and "WB−", parameters in the upward and downward directions are "SATURATION+" and "SATURATION−", and parameters in the upper left and lower right directions are "FOCUS+" and "FOCUS−".

In this case, image switching in relation to the parameters "EXPOSURE+", "EXPOSURE−", "SATURATION+", and "SATURATION−" in the upward, downward, rightward, and leftward directions are performed using the up, down, right, and left keys. Image switching in relation to the parameters "WB+", "WB−" "FOCUS+", and "FOCUS−" in the upper right, lower left, upper left, and lower right directions are performed by two keys being pressed simultaneously. That is, image switching in relation to the parameter "WB+" is performed by the right key and the up key being simultaneously pressed, image switching in relation to the parameter "FOCUS−" is performed by the left key and the up key being simultaneously pressed, image switching in relation to the parameter "WB−" is performed by the left key and the down key being simultaneously pressed, and image switching in relation to the parameter "FOCUS+" is performed by the right key and the down key being simultaneously pressed. By this configuration being adopted in which plural types (eight types) of imaging parameter names are displayed corresponding to eight directions when an index indicating information regarding the array status of a plurality of images is displayed for each direction, images captured while imaging parameters are being variously changed by bracket photographing can be checked.

Figure 18:
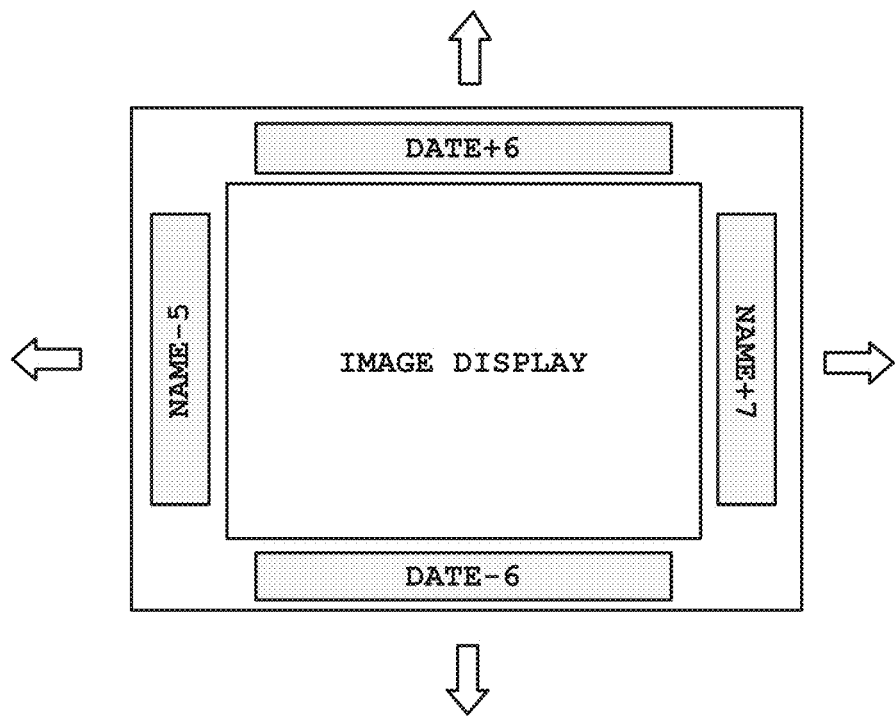
FIG. 18 is a diagram showing an example where the present invention has been applied to one captured image.

In the above-described embodiment, the present invention is applied to images captured by bracket photographing when indexes indicating information regarding the array status of a plurality of images are displayed for each direction. However, the present invention may be applied to images captured by one-image photographing. FIG. 18 is a diagram showing a display example when the present invention has been applied to images captured by one-image photographing, in which their image capturing dates and names have been stored as plural types of parameters, and the names of these parameters and numerical values indicating the number of images by which image switching can be performed have been displayed corresponding to four directions (upward, downward, rightward, and leftward directions) relative to an image being displayed. In FIG. 18, "NAME+7" is an index indicating that the number of images by which image switching can be performed in a forward direction in the name parameter is seven, "NAME−5" is an index indicating that the number of images by which image switching can be performed in the opposite direction in the name parameter is five, "DATE+6" is an index indicating that the number of images by which image switching can be performed in a forward direction in the date parameter is six, and "DATE−6" is an index indicating that the number of images by which image switching can be performed in the opposite direction in the date parameter is six.

Also, the above-described plurality of images in the present embodiment are images captured by bracket photographing. However, they are not limited to images captured by bracket photographing and the present invention may be applied to a plurality of images acquired while plural types of imaging parameters are being changed manually.

Moreover, in the above-described embodiment, as plurality of data for which indexes indicating information regarding the array status of a plurality of images are displayed, captured images have been exemplarily described. However, they are not limited to captured images and may be text data (file).

Figure 19A:
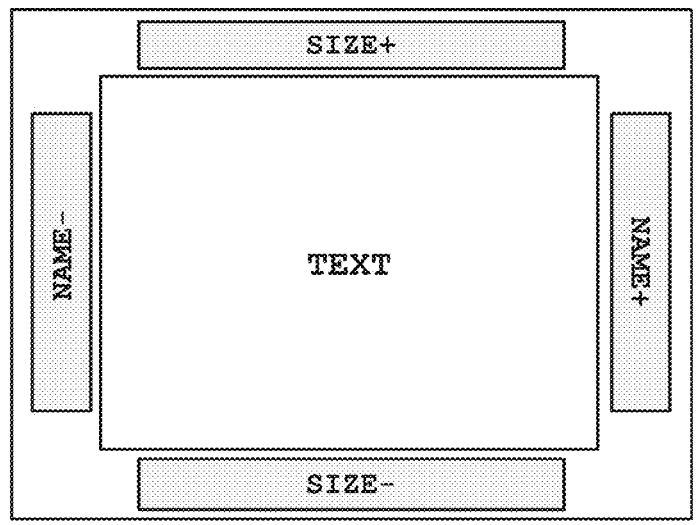
FIG. 19A and FIG. 19B are diagrams for explaining a modification example of the embodiment, in which the present invention has been used for text data.
Figure 19B:
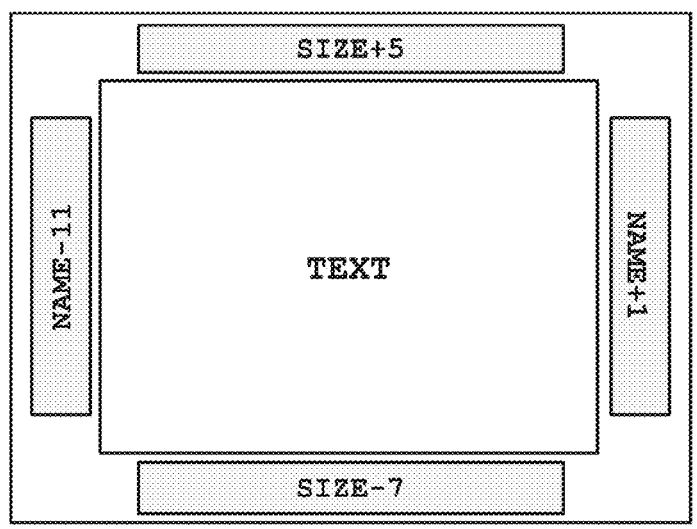

FIG. 19A and FIG. 19B are diagrams showing examples where these plurality of data are text data, in which their sizes and names have been stored as plural types of parameters. In FIG. 19A, the names of the imaging parameters have been displayed corresponding to four directions, that is, upward, downward, rightward, and leftward directions relative to data (data including the beginning of the text by the displayable number of characters) being displayed. Here, "NAME+" is an index indicating data switching in a forward direction in the name parameter, "NAME−" is an index indicating data switching in the opposite direction in the name parameter, "SIZE+" is an index indicating data switching in a forward direction in the file size parameter, and "SIZE−" is an index indicating data switching in the opposite direction in the file size parameter.

In FIG. 19B, the parameter names and numerical values indicating the number of data (the number of files) by which data switching can be performed have been displayed. Specifically, the imaging parameter names and the numerical values indicating the number of files by which data switching can be performed have been displayed corresponding to four directions, that is, upward, downward, rightward, and leftward directions relative to data (data including the beginning of the text by the displayable number of characters) being displayed. Here, "NAME+1" is an index indicating that the number of files by which data switching can be performed in a forward direction in the name parameter is one, "NAME−11" is an index indicating that the number of files by which data switching can be performed in the opposite direction in the name parameter is eleven, "SIZE+5" is an index indicating that the number of data by which data switching can be performed in a forward direction in the file size parameter is five, and "SIZE−7" is an index indicating that the number of data by which data switching can be performed in the opposite direction in the file size parameter is 7.

In the above-described embodiment, when performing a switching operation at the time of playback, the user operates the cross key K3 to specify an upward, downward, leftward, or rightward direction. However, the present invention is not limited thereto and other operators may be used. For example, the dedicated operators which are used to change values for each imaging parameter at the time of image capturing may be used as the cross key K3. That is, the exposure correction dial may be used for an exposure parameter, the zoom ring may be used for a zoom parameter, and the focus ring may be used for a focus parameter. Also, a touch operation (such as a flick operation, a tap operation, and the like) on the touch panel may be performed therefor. In this case, even operations toward more than five directions can be easily performed. Also, in the above-described embodiment, the user arbitrarily selects an imaging scene from the scene selections screen. However, a configuration where an imaging scene is automatically judged and selected based on an imaging status may be adopted.

Moreover, in the above-described embodiment, images are virtually and two-dimensionally arrayed. However, they may be three-dimensionally or one-dimensionally arrayed.

Furthermore, in the above-described embodiment, the present invention has been applied to a digital camera (imaging apparatus) as a data display apparatus for individually displaying a plurality of data. However, the present invention is not limited thereto, and may be applied to a personal computer, a PDA (a personal digital assistant), a tablet terminal, a portable telephone such as a smartphone, a video game machine, a music player, or the like.

Still further, the "apparatus" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A data display apparatus comprising a processor which is configured to perform functions comprising:
    arraying a plurality of data in virtual and multiple dimensions according to a plurality of criteria;
    distinctly displaying, as indexes for indicating that data switching can be performed in an array direction in each dimension with an arrayed position of data selected as a display target from among the plurality of arrayed data as a starting point, information regarding an array status of the plurality of data in an array direction in each dimension, in association with plural directions in which data switching can be performed; and
    when an arbitrary direction is selected from among the plural directions in which data switching can be performed and an instruction to perform data switching in a selected direction is given, updating the display target by performing data switching in the selected direction,
    wherein, for each data switching direction, in numerical values, a number of data by which data switching can be performed is displayed, as the information regarding the array status, and
    wherein the processor is further configured to display data of the display target in a same display size, regardless of the displayed number of data by which data switching can be performed.

2. An image display apparatus comprising:
    a display section;
    a plurality of change operation sections each of which is exclusively provided for each of plural types of imaging parameters, and which, when photographing by a user operation is performed, are used for a user operation of setting an imaging condition by changing parameter values for the plural types of imaging parameters; and
    a processor which is configured to perform functions comprising:
        acquiring a series of images obtained by capturing a same photographic subject multiple times while automatically changing parameter values for imaging parameters from among the plural types of imaging parameters;

displaying, on the display section, one image from among the series of images acquired by capturing the same photographic subject;

when a user operation is performed on, among the plurality of change operation sections, a change operation section corresponding to a given imaging parameter from among the imaging parameters automatically changed when the series of images including the one image being displayed on the display section have been captured, specifying a given image from among the other images having different parameter values corresponding to the same given imaging parameter as the one image being displayed; and switching the image being displayed on the display section to the specified given image.

3. The image display apparatus according to claim 2, wherein the specified given image is specified to be a display target such that the photographic subject and imaging parameters other than the given imaging parameter related to the user operation for changing the parameter value are not changed.

4. An image display method comprising:

acquiring a series of images obtained by capturing a same photographic subject multiple times while automatically changing parameter values for imaging parameters from among plural types of imaging parameters;

displaying, on a display section, one of the series of images acquired by capturing the same photographic subject;

when a user operation is performed on a given change operation section corresponding to a given imaging parameter from the imaging parameters automatically changed when the series of images including the one image being displayed on the display section have been captured, the given change operation section being from among a plurality of change operation sections each of which is exclusively provided for each of the plural types of imaging parameters, and which, when photographing by a user operation is performed, are used for a user operation of setting an imaging condition by changing parameter values for the plural types of imaging parameters, specifying a given image from among the other images having different parameter values corresponding to the same given imaging parameter as the one image being displayed; and switching the image being displayed to the specified given image.

5. A data display method comprising:

arraying a plurality of data in virtual and multiple dimensions according to a plurality of criteria;

distinctly displaying, as indexes for indicating that data switching can be performed in an array direction in each dimension with an arrayed position of data selected as a display target from among the plurality of arrayed data as a starting point, information regarding an array status of the plurality of data in an array direction in each dimension, in association with plural directions in which data switching can be performed; and when an arbitrary direction is selected from among the plural directions in which data switching can be performed and an instruction to perform data switching in a selected direction is given, updating the display target by performing data switching in the selected direction, wherein, for each data switching direction, a number of data by which data switching can be performed is displayed in numerical values as the information regarding the array status, and wherein data of the display target is displayed in a same display size, regardless of the number of data by which data switching can be performed.

* * * * *